United States Patent
Ju et al.

(10) Patent No.: US 10,027,020 B2
(45) Date of Patent: Jul. 17, 2018

(54) NEAR FIELD COMMUNICATION ANTENNA AND SMARTPHONE HAVING ANTENNA

(71) Applicant: AQ CORPORATION, Suwon-si, Gyeonggi-do (KR)

(72) Inventors: Seong-Nam Ju, Hwaseong-si (KR); Ji-Young Kwak, Cheonan-si (KR); Young-Sung Kang, Yongin-si (KR); Sang-Hoon Lee, Suwon-si (KR)

(73) Assignee: AQ CORPORATION, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/518,239

(22) PCT Filed: Jul. 24, 2015

(86) PCT No.: PCT/KR2015/007706
§ 371 (c)(1),
(2) Date: Apr. 10, 2017

(87) PCT Pub. No.: WO2016/056736
PCT Pub. Date: Apr. 14, 2016

(65) Prior Publication Data
US 2017/0331173 A1    Nov. 16, 2017

Related U.S. Application Data

(60) Provisional application No. 62/062,775, filed on Oct. 10, 2014.

(51) Int. Cl.
*H04M 1/00* (2006.01)
*H01Q 1/24* (2006.01)
(Continued)

(52) U.S. Cl.
CPC ............ *H01Q 1/243* (2013.01); *H01Q 7/06* (2013.01); *H04B 5/0025* (2013.01); *H04M 2250/04* (2013.01)

(58) Field of Classification Search
CPC ........ H01Q 1/242; H01Q 1/243; H01Q 1/244; H01Q 7/06; H01Q 1/084; H04B 5/02;
(Continued)

(56) References Cited

U.S. PATENT DOCUMENTS

| 3,017,633 A | 1/1962 | Marston et al. |
| 5,929,825 A | 7/1999 | Niu et al. |

(Continued)

FOREIGN PATENT DOCUMENTS

| JP | 2010-278518 A | 12/2010 |
| JP | 2013-121247 A | 6/2013 |

(Continued)

OTHER PUBLICATIONS

International Search Report dated Nov. 19, 2015 of PCT/KR2015/007706 which is the parent application and its English translation—4 pages.

*Primary Examiner* — Nhan Le
(74) *Attorney, Agent, or Firm* — Knobbe Martens Olson & Bear LLP

(57) ABSTRACT

A near field communication (NFC) antenna and a smartphone having the antenna are disclosed. The present disclosure provides a parallel stacked NFC antenna, of a smartphone, suitable for NFC communication. In addition, provided is a component arrangement structure capable of performing effective NFC communication by determining the location of the NFC antenna on the basis of the location of a slit arranged in a metal housing, and a battery.

20 Claims, 26 Drawing Sheets

(51) Int. Cl.
*H04B 5/00* (2006.01)
*H01Q 7/06* (2006.01)

(58) Field of Classification Search
CPC ...... H04B 5/0025; H04B 5/0012; H04B 5/00; H04M 2250/04
USPC .................................. 455/575.7, 90.2, 90.3
See application file for complete search history.

(56) References Cited

U.S. PATENT DOCUMENTS

| | | | |
|---|---|---|---|
| 8,294,629 B2 | 10/2012 | Yosui et al. | |
| 8,436,780 B2 | 5/2013 | Schantz et al. | |
| 8,604,992 B2 | 12/2013 | Kobayashi et al. | |
| 8,638,268 B2 | 1/2014 | Yosui et al. | |
| 9,553,476 B2 * | 1/2017 | An ........................ | H01Q 1/22 |
| 9,786,989 B2 * | 10/2017 | Horikoshi ............... | H01Q 7/06 |
| 9,812,768 B2 * | 11/2017 | Youm ..................... | H01Q 1/40 |
| 2014/0071011 A1 | 3/2014 | Yosui et al. | |
| 2014/0139380 A1 | 5/2014 | Ouyang et al. | |
| 2015/0207207 A1 * | 7/2015 | Park ....................... | H01Q 1/243 |
| | | | 343/702 |
| 2017/0085301 A1 * | 3/2017 | Chen ...................... | H01Q 7/00 |

FOREIGN PATENT DOCUMENTS

| | | |
|---|---|---|
| JP | 2014-64284 A | 4/2014 |
| KR | 10-2008-0008687 A | 1/2008 |
| KR | 10-2010-0005071 A | 1/2010 |
| KR | 10-1185503 B1 | 9/2012 |
| KR | 10-1339020 B1 | 12/2013 |

* cited by examiner

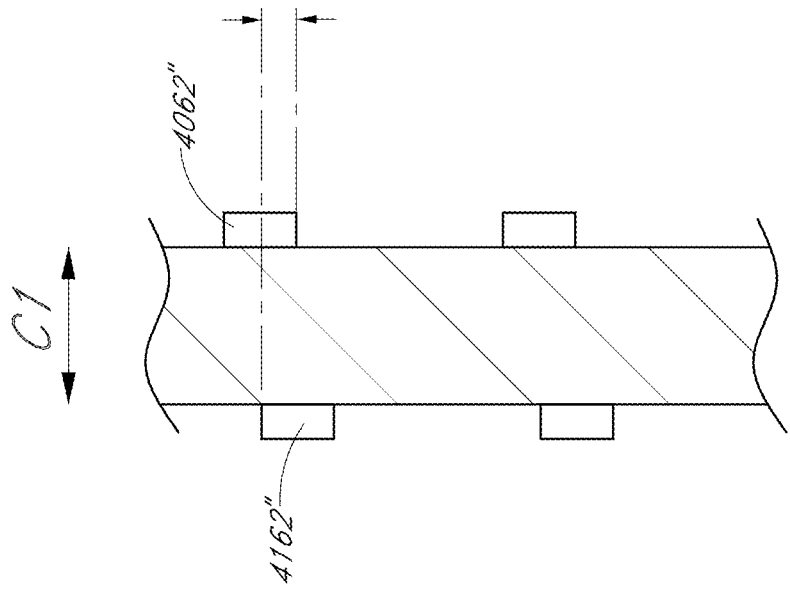
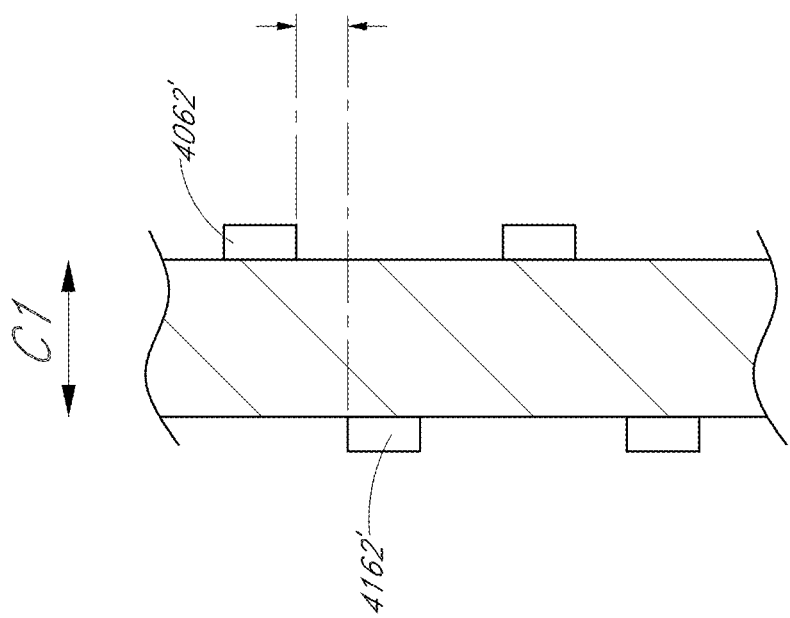

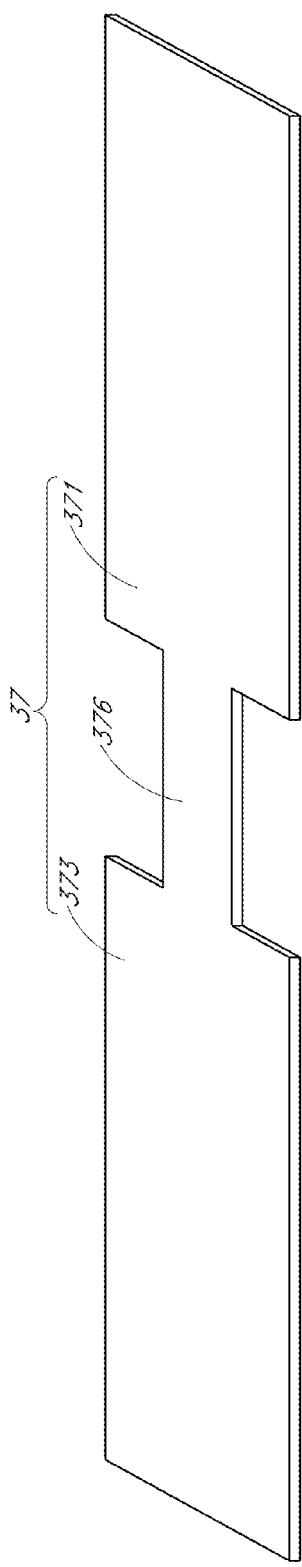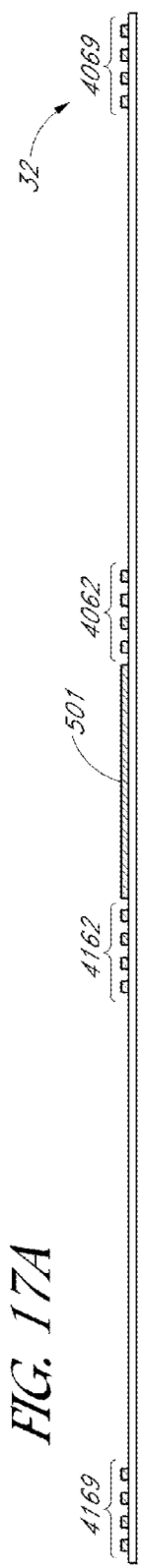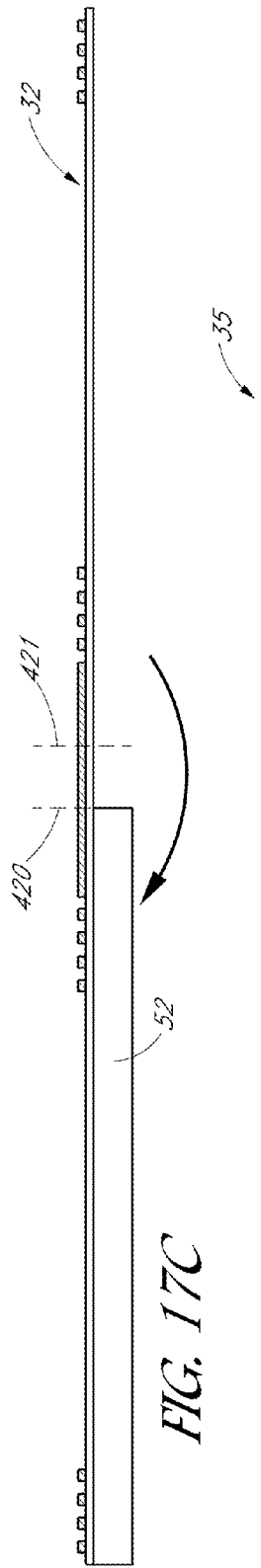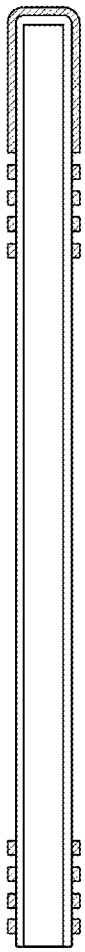
FIG. 17A
FIG. 17B
FIG. 17C
FIG. 17D

NEAR FIELD COMMUNICATION ANTENNA AND SMARTPHONE HAVING ANTENNA

FIELD

The present disclosure relates to a near field communication (NFC) antenna and a smartphone having the antenna.

BACKGROUND TECHNOLOGY

Near Field Communication (NFC) is a standard allowing wireless communication in a Radio Frequency (RF) band between portable devices, such as smartphones, or between a portable device and a fixed device (an NFC terminal). For the communication, for example, a portable device having an NFC circuit is placed in the vicinity of the NFC terminal (e.g., as close as a distance of about 10 cm or less) or is brought into contact with the NFC terminal. Then, an RF wireless communication channel is established between the portable device and the NFC terminal, so that the portable device may perform NFC communication with the NFC terminal.

According to the standard of near field communication, the NFC communication uses a frequency band of 13.56 MHz, and RF communication is accomplished within a distance of about 10 cm or less. From this viewpoint, the NFC communication is distinguished from other wireless communication in different RF bands. For example, Bluetooth communication is used to communicate within a distance of about 1 m using a frequency band of 2.4 to 2.5 GHz. Wi-Fi communication is used to communicate within a distance of about 20 m or less using a frequency band of 2.4 or 5 GHz. LTE communication frequently used for data communication of a smartphone uses a frequency band of about 700 MHz to about 2.5 GHz although the frequency band varies by region or country. Compared with other RF wireless communications, the NFC communication uses a considerably low frequency band. Further, the NFC communication provides wireless communications between devices within a very short distance.

Recently, a circuit and an antenna for enabling near field RF communication begin to be mounted in a smartphone. However, wireless communication circuits and components for providing various kinds of wireless communications (e.g., LTE communication, Wi-Fi communication and Bluetooth communication) are housed in the smartphone, and various kinds of antennas are also mounted in the smartphone. In addition, components that may affect the wireless communication, such as a battery and the like, are also mounted in the smartphone. Accordingly, spaces for installing the NFC circuit or antenna are limited. There are also a lot of things to be considered in practice in designs of the antenna and the smartphone in order to satisfy various requirements required by standards of near field communications even under the limited condition of spaces.

The aforementioned description is intended to illustrate a general background of the present invention and does not constitute an admission that the described contents are prior arts.

SUMMARY

Technical Problem

In a smartphone, components such as a circuit including various kinds of semiconductor chips, a display, a battery, a camera, a communication antenna module and the like are densely integrated in a small space of a housing of the smartphone. Recently, for various reasons including durability, internal device protection function, heat dissipation, gorgeous appearance and the like, the housing of the smartphone tends to be made of a metal. However, the metal housing may significantly affect operations of various antennas in the smartphone. Moreover, due to the high degree of compactness, internal components such as a battery may also significantly affect the operations of the antennas. Particularly, since an NFC antenna, among the antennas, uses a considerably low frequency band and handles wireless signals of considerably long wavelengths as compared with other wireless antennas, the size of the NFC antenna is relatively larger than those of other antennas. Accordingly, the NFC antenna overlaps the metal housing, the battery or the like more than other antennas.

Technical Solution

According to an aspect of the present invention, there is provided a smartphone including a housing; and a near field communication (NFC) antenna housed in the housing, wherein the housing includes a rear cover defining a backside of the smartphone, wherein the rear cover includes an electrically conductive first metal plate portion, and an electrically conductive second metal plate portion spaced apart from the first metal plate portion, wherein the first metal plate portion includes a first edge, the second metal plate portion includes a second edge facing the first edge, and a slit is formed by the first edge and the second edge, wherein the NFC antenna includes a plate-shaped magnetic core of a ferromagnetic material, a first antenna coil with a wire coiled multiple times in a loop shape, and a second antenna coil with a wire coiled multiple times in a loop shape, wherein the magnetic core includes a first surface, and a second surface opposite to the first surface, wherein the first antenna coil is placed on the first surface of the magnetic core and the second antenna coil is placed on the second surface of the magnetic core, so that the magnetic core is disposed between the first antenna coil and the second antenna coil, wherein the NFC antenna is disposed such that the first surface of the magnetic core faces the rear cover so as to cause at least a part of the first antenna coil to be interposed between the magnetic core and the rear cover, wherein the first antenna coil and the second antenna coil are coiled in loop shapes and connected in parallel to each other so that an electrical current flows in an identical direction, when viewed in a direction perpendicular to the backside of the smartphone, and wherein each of the first antenna coil and the second antenna coil comprises first and second portions extending in proximity with the slit, wherein the first portion one or more lines overlapping with the first metal plate portion and the second portion comprises one or more lines overlapping with the second metal plate portion.

In embodiments, the first portion may be longer than the second portion. The first portion of each of the first antenna coil and the second antenna coil may extend generally along the slit. The slit may extend in a straight line, and the first portion of each of the first antenna coil and the second antenna coil may extend in a straight line. The slit may extend in an arc-shaped curved line, and the first portion of each of the first antenna coil and the second antenna coil may extend in an arc-shaped curved line. The slit may extend in a curved line, and the first portion of each of the first antenna coil and the second antenna coil may extend in a straight line. The slit may extend in a straight line, and the first portion of each of the first antenna coil and the second antenna coil may extend in a curved line.

In embodiments, each of the first antenna coil and the second antenna coil may form a loop by including a first longitudinal linear segment, a second longitudinal linear segment, and a first lateral linear segment and a second lateral linear segment for connecting the first and second longitudinal linear segments; the first portion may include the first longitudinal linear segment, and the second portion may include the second longitudinal linear segment, at least a part of the first lateral linear segment and at least a part of the second lateral linear segment; the first longitudinal linear segment may include a plurality of lines extending in a longitudinal direction and arranged parallel to one another; and the NFC antenna may be disposed such that at least some of the lines of the first longitudinal linear section overlap with the first metal plate portion, and the second longitudinal linear section overlaps with the second metal plate portion, when viewed in the direction perpendicular to the backside of the smartphone. The NFC antenna may be disposed such that the first longitudinal linear segment does not overlap with the second metal plate portion when viewed in the direction perpendicular to the backside of the smartphone. The NFC antenna may be disposed such that the first longitudinal linear segment does not overlap with the slit when viewed in the direction perpendicular to the backside of the smartphone. Portions of the first and second lateral linear segments may overlap with the slit when viewed in the direction perpendicular to the backside of the smartphone.

In embodiments, the first antenna coil and the second antenna coil may be in plane symmetry. The first longitudinal linear segment of the first antenna coil may overlap with the first longitudinal linear segment of the second antenna coil when viewed in the direction perpendicular to the backside of the smartphone. The second longitudinal linear segment of the first antenna coil may not overlap with the second longitudinal linear segment of the second antenna coil when viewed in the direction perpendicular to the backside of the smartphone. The second lateral linear segment of the first antenna coil may not overlap with the second lateral linear segment of the second antenna coil when viewed in the direction perpendicular to the backside of the smartphone. The magnetic core may not be disposed between the first longitudinal linear segment of the first antenna coil and the first longitudinal linear segment of the second antenna coil when viewed in the direction perpendicular to the backside of the smartphone.

In embodiments, a distance between the first edge and the second edge may be about 0.5 mm to about 20 mm. The smartphone may further include an additional magnetic core placed on the second surface of the magnetic core, wherein the second antenna coil may be placed between the magnetic core and the additional magnetic core. The magnetic core may not overlap with the first metal plate portion when viewed in the direction perpendicular to the backside of the smartphone. The first metal plate portion and the second metal plate portion may not be electrically connected. The first and second metal plate portions may be made of aluminum or an aluminum alloy. The smartphone may further include a piece of electrically non-conductive material for covering the slit, wherein the electrically non-conductive material may be a polymeric plastic material. The magnetic core may be made of a ferrite material. The first metal plate portion may be disposed at an upper end or a lower end of the smartphone, and the second metal plate portion may cover most of the other area of the backside of the smartphone.

In embodiments, in the NFC antenna, the first antenna coil may be placed in a first imaginary plane without being folded, the second antenna coil may be placed in a second imaginary plane without being folded, and the first imaginary plane and the second imaginary plane may be generally parallel to each other. In the NFC antenna, a conductive via penetrating through the magnetic core to electrically connect the first antenna coil and the second antenna coil may not exist between the first antenna coil and the second antenna coil. The smartphone may further include a battery, wherein the first portion may not overlap with the battery when viewed in the direction perpendicular to the backside of the smartphone. The first antenna coil may be disposed between the magnetic core and the rear cover, and a ferromagnetic material may not be interposed between the first antenna coil and the rear cover.

In embodiments, in the NFC antenna, the first antenna coil and the second antenna coil may not be connected in series, and the NFC antenna may not include another antenna coil connected in series with the first antenna coil or the second antenna coil. The NFC antenna may further include third antenna coil, the second antenna coil may be disposed between the first antenna coil and the third antenna coil, the magnetic core may be disposed between the third antenna coil and the second antenna coil, and the second antenna coil and the third antenna coil may be coiled in loop shapes and connected in parallel to each other so that an electrical current flows in an identical direction, when viewed in the direction perpendicular to the backside of the smartphone. In the NFC antenna, the first antenna coil may have a first inner end and a first outer end, the second antenna coil may have a second inner end and a second outer end, the first and second inner ends may be electrically connected and the first and second outer ends may be electrically connected so that the first antenna coil and the second antenna coil are connected in parallel, and the first antenna coil and the second antenna coil may be coiled in an identical direction when viewed in the direction perpendicular to the backside of the smartphone. In the NFC antenna, the first antenna coil may have a first inner end and a first outer end, the second antenna coil may have a second inner end and a second outer end, the first inner end and the second outer end may be electrically connected and the first outer end and the second inner end may be electrically connected so that the first antenna coil and the second antenna coil are connected in parallel, and the first antenna coil and the second antenna coil may be coiled in opposite directions when viewed in the direction perpendicular to the backside of the smartphone.

According to another aspect, there is provided a method of performing near field communication with an NFC terminal device outside a smartphone by using the smartphone provided with a near field communication (NFC) device, wherein the method includes the steps of providing the aforementioned smartphone; and supplying an electrical current signal to an antenna coil to generate radio waves to be transmitted to the NFC terminal device, wherein a position where a magnetic field strength H generated by the supply of the electrical current signal has a maximum value among positions on the rear cover is between the first edge and the second edge or a point in proximity with the second edge of the second metal plate portion.

According to a further aspect, there is provided a near field communication (NFC) antenna including a plate-shaped magnetic core of a ferromagnetic material; a first antenna coil with a wire coiled multiple times in a loop shape; and a second antenna coil with a wire coiled multiple times in a loop shape, wherein the magnetic core includes a first surface, and a second surface opposite to the first surface, wherein the first antenna coil is placed on the first surface of the magnetic core and the second antenna coil is placed on the second surface of the magnetic core, so that the magnetic core is disposed between the first antenna coil and the second antenna coil, and wherein the first antenna coil and the second antenna coil are coiled in loop shapes and connected in parallel to each other so that an electrical current flows in an identical direction, when viewed in a direction perpendicular to the first surface.

In embodiments, the first antenna coil and the second antenna coil may be in plane symmetry. Each of the first antenna coil and the second antenna coil may form a loop by including a first longitudinal linear segment, a second longitudinal linear segment, and a first lateral linear segment and a second lateral linear segment for connecting the first and second longitudinal linear segments. The first longitudinal linear segment of the first antenna coil and the first longitudinal linear segment of the second antenna coil may at least partially overlap with each other when viewed in the direction perpendicular to the first surface. The second longitudinal linear segment of the first antenna coil may not overlap with the second longitudinal linear segment of the second antenna coil when viewed in the direction perpendicular to the first surface. The second lateral linear segment of the first antenna coil may not overlap with the second lateral linear segment of the second antenna coil when viewed in the direction perpendicular to the first surface.

In embodiments, the magnetic core may not be disposed between the first longitudinal linear segment of the first antenna coil and the first longitudinal linear segment of the second antenna coil when viewed in the direction perpendicular to the first surface. The magnetic core may be made of a ferrite material. The first antenna coil may be placed in a first imaginary plane without being folded, the second antenna coil may be placed in a second imaginary plane without being folded, and the first imaginary plane and the second imaginary plane may be generally parallel to each other. A conductive via penetrating the magnetic core to electrically connect the first antenna coil and the second antenna coil may not exist between the first antenna coil and the second antenna coil. The first antenna coil and the second antenna coil may not be connected in series, and the NFC antenna does not include another antenna coil connected in series with the first antenna coil or the second antenna coil. The NFC antenna may further include a third antenna coil, wherein the second antenna coil may be disposed between the first antenna coil and the third antenna coil, the magnetic core may be disposed between the third antenna coil and the second antenna coil, and the second antenna coil and the third antenna coil may be coiled in loop shapes and connected in parallel to each other so that an electrical current flows in an identical direction, when viewed in the direction perpendicular to the first surface.

In embodiments, the first antenna coil may have a first inner end and a first outer end, the second antenna coil may have a second inner end and a second outer end, the first and second inner ends may be electrically connected and the first and second outer ends may be electrically connected so that the first antenna coil and the second antenna coil are connected in parallel, and the first antenna coil and the second antenna coil may be coiled in an identical direction when viewed in the direction perpendicular to the first surface. The first antenna coil may have a first inner end and a first outer end, the second antenna coil may have a second inner end and a second outer end, the first inner end and the second outer end may be electrically connected and the first outer end and the second inner end may be electrically connected so that the first antenna coil and the second antenna coil are connected in parallel, and the first antenna coil and the second antenna coil may be coiled in opposite directions when viewed in the direction perpendicular to the backside of the smartphone.

Advantageous Effect

In a smartphone, it is advantageous that improvement is made in the structure of an NFC antenna to further reduce the size of the NFC antenna. In addition, when determining the location of the NFC antenna in the smartphone, it is advantageous to choose a location to be less affected by internal components, such as a battery or a metal housing. To this end, a change in the structure of a metal housing may be required. In various embodiments of the present invention to be described below, a parallel stacked NFC antenna suitable for NFC communication of the smartphone is provided since the size of the NFC antenna can be reduced. Furthermore, an arrangement of components of a smartphone capable of performing effective NFC communication is provided by determining the location of the NFC antenna on the basis of the location of a slit arranged in the metal housing and the location of the battery.

BRIEF DESCRIPTION OF DRAWINGS

FIGS. 5B and 5C are sectional views of portions of NFC antennas according to other embodiments.

FIGS. 17A to 17D show a process of manufacturing the antenna shown in FIG. 4.

FIG. 27 is a rear view of a smartphone according to embodiments of the present invention, showing an arrangement of an antenna different from those of the embodiments shown in FIGS. 3 and 25.

EMBODIMENTS

Figure 1:
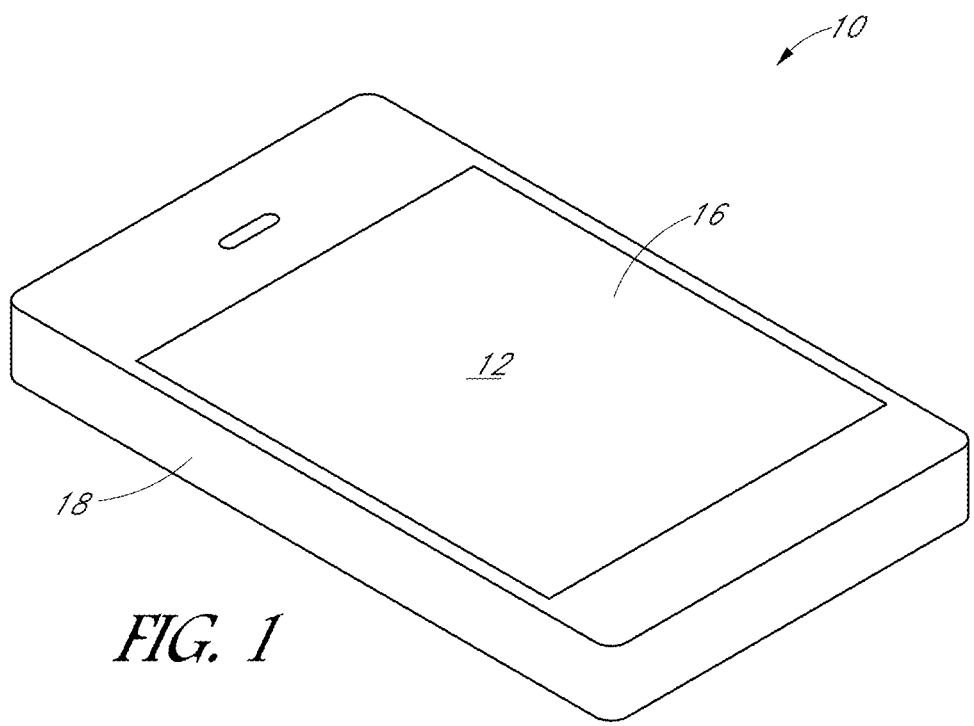
FIG. 1 is a perspective view of a smartphone according to embodiments of the present invention, showing a front side of the smartphone.

Hereinafter, embodiments of the present invention are described with reference to the accompanying drawings. Actual shapes are reflected on respective components shown in the figures to aid understanding of the embodiments. However, lengths, thicknesses, areas, proportions of these dimensions and the like of respective components may be changed, and the present invention is not limited to the lengths, thicknesses, areas, proportions of these dimensions and the like represented herein. Meanwhile, terms for indicating directions or relative positions such as front, back, upper, lower, left, right and the like are used herein. The terms are to provide convenience in understanding the descriptions of the illustrated embodiments and they themselves do not limit the present invention. It will be understood by those skilled in the art that the terms for indicating directions or relative positions may be used in different manners.

Smartphone and NFC Antenna

In a smartphone, components such as circuits including various kinds of semiconductor chips, a display, a battery, a camera, communication modules and the like are densely integrated in a small space of a housing of the smartphone. Recently, for various reasons including durability, internal component protection function, heat dissipation, gorgeous appearance and the like, the housing of the smartphone tends to be made of a metal. However, the metal housing may significantly affect operations of various antennas in the smartphone. In addition, due to the high degree of compactness, internal components such as a battery may also significantly affect the operations of the antennas. Particularly, since an NFC antenna, among the antennas, uses a considerably low frequency band and handles wireless signals of considerably long wavelengths as compared with other wireless antennas, it is typical that the size of the NFC antenna is greater than those of other antennas. Accordingly, the location of the antenna overlaps with the location of the metal housing, the battery or the like more than those of the other antennas.

Therefore, in the smartphone, it is advantageous if improvement in the structure of the NFC antenna for further reducing the size of the NFC antenna is accomplished. Moreover, when the location of the NFC antenna is determined in the smartphone, it is advantageous to determine the location to be less affected by other internal components, such as a battery, or a metal housing. To this end, the structure of the metal housing may need to be changed. In various embodiments of the present invention described below, parallel stacked NFC antennas suitable for NFC communication of the smartphone and having reduced size are provided. In addition, an arrangement structure of components of a smartphone capable of performing effective NFC communication is provided by preparing a slit in the metal housing, determining the location of the NFC antenna on the basis of the location of the slit, and determining the location of the NFC antenna on the basis of the location of the battery. Hereinafter, various embodiments are described in detail below.

Smartphone Having a Plurality of Devices

Figure 2:
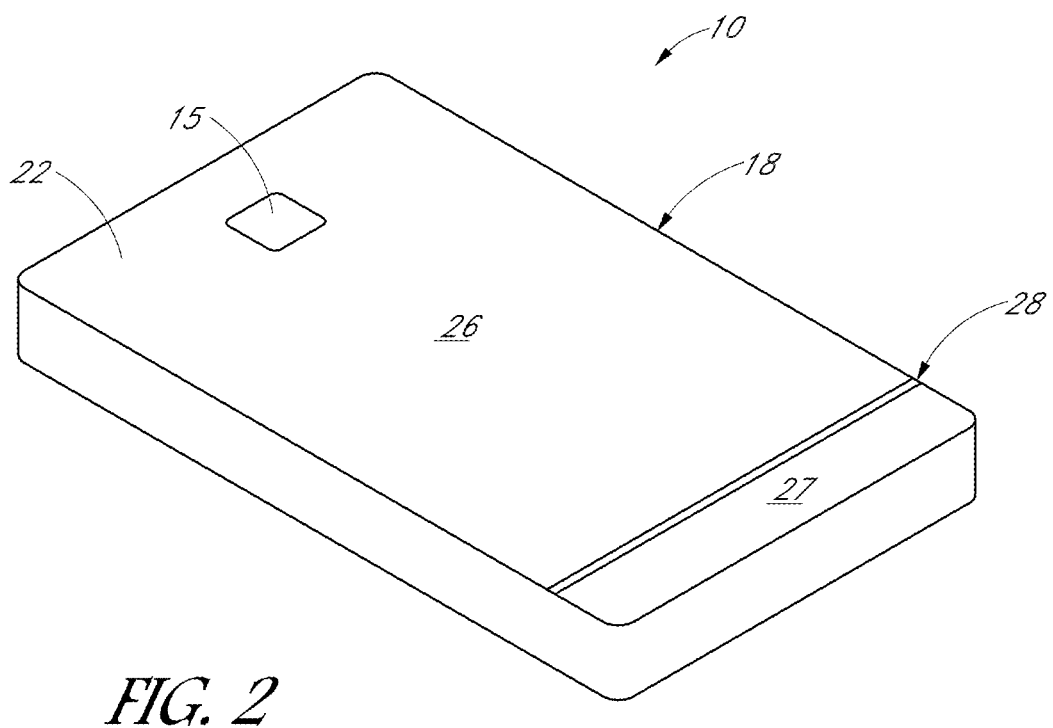
FIG. 2 is a perspective view of the smartphone shown in FIG. 1, showing a backside of the smartphone.
Figure 3:
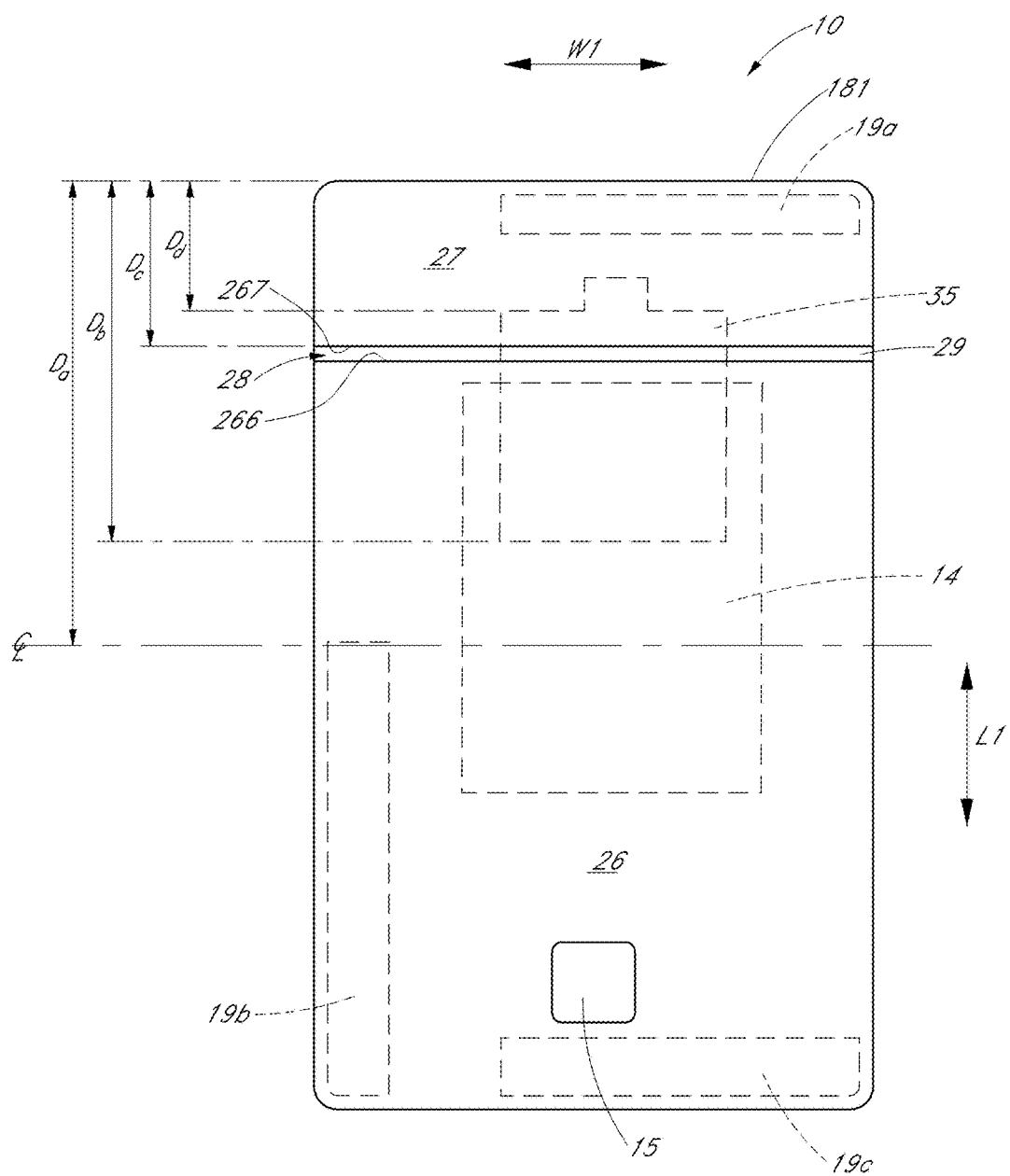
FIG. 3 is a rear view of the smartphone shown in FIG. 1, showing the backside of the smartphone.

A smartphone according to embodiments shown in FIGS. 1 to 3 has components such as a display 12, various circuit elements (processor chips, memory chips, PCBs, connectors, wires and the like), a battery 14, a camera 15, and a plurality of wireless communication antennas 19a, 19b, 19c and 35. These components may be in the form of a module with several structures combined thereinto. Referring to FIG. 1, the display 12 provided in the smartphone 10 has a display surface 16 exposed to the outside. Herein, a side on which the display surface 16 is provided is referred to as a front side of the smartphone 10. Another side opposite to the display surface 16 is referred to as a backside of the smartphone. The smartphone 10 is provided with a housing 18 in which various circuits, various components such as a battery and the like, and the plurality of wireless communication antennas 19a, 19b, 19b and 35 are densely housed.

NFC Antenna in Smartphone

An NFC antenna 35 is housed in the smartphone 10 for near field communication. However, since various kinds of elements and components are densely packed in the smartphone 10, the configuration, location and orientation of the NFC antenna and the elements and components around the NFC antenna may significantly affect performance of the antenna.

Rear Cover

Referring to FIGS. 1 to 3, the housing 18 of the smartphone 10 includes a rear cover 22. The rear cover 22 provides the backside of the smartphone. The rear cover 22 is provided with a hole through which a camera 15 is exposed.

In embodiments shown in FIGS. 2 and 3, the rear cover 22 includes two metal plates 26 and 27 spaced apart from each other and includes a piece of non-metallic material 29 for filling a gap or slit 28 between the metal plates. Referring to FIGS. 2 and 3, the two metal plates 26 and 27 form most of the rear cover 22. When most of the rear cover is formed of a metal, it provides improved resistance to pressure or impact exerted from the outside. Accordingly, the rear cover protects well the components housed in the smartphone 10. Furthermore, the metal plate has higher rigidity and strength as compared with a plastic material, so that the rear cover may be made thinner. Since the metal conducts heat well, it is also advantageous in dissipating heat from the inside of the smartphone.

Figure 24:
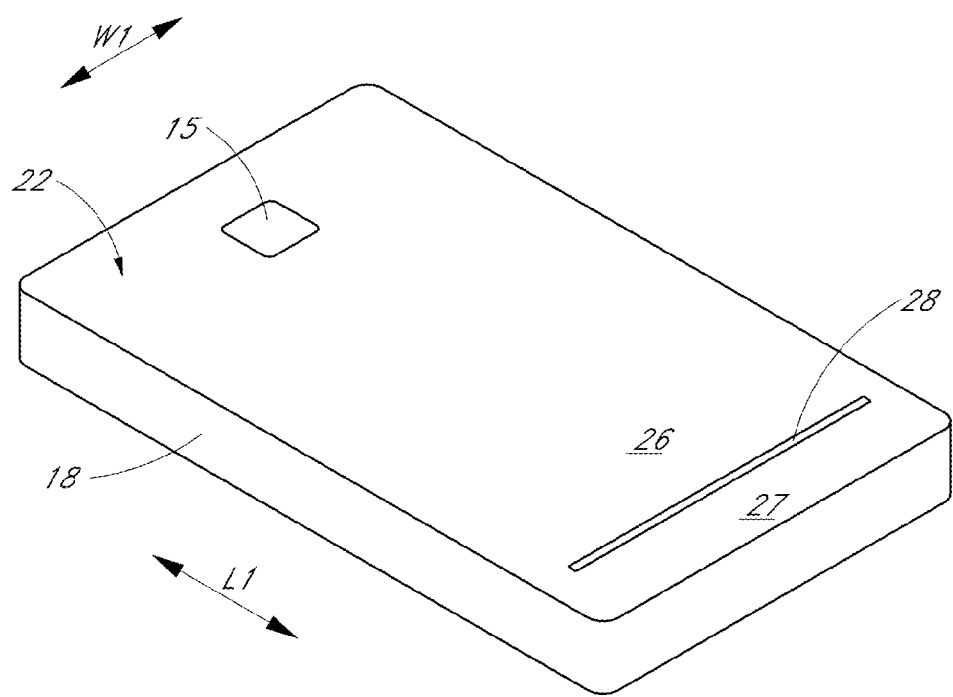
FIG. 24 is a perspective view of a smartphone according to embodiments of the present invention, showing a backside of the smartphone.

However, if the rear cover is entirely made of a metal, the metal may seriously block electromagnetic waves radiated from the NFC antenna mounted within the housing, since the metal has electrical conductivity. Accordingly, as shown in FIGS. 2, 3, 7 and 8, the gap or slit is arranged between the metal plates 26 and 27, and the NFC antenna is arranged to be placed at a specific location with respect to the slit 28. In the illustrated embodiment, the piece of non-metallic material 29 is sized to be snugly fit to the slit 28 and is inserted into the slit. The metal plates 26 and 27 and the piece of electrically non-conductive material 29 are connected integrally to each other to form the rear cover 22. Although the slit has been described as being formed between the two metal plates 26 and 27 in the illustrated embodiment, the rear cover may be formed in a configuration in which the slit is formed to extend in a width direction W1 on a single metal plate in another embodiment as shown in FIG. 24. Furthermore, although the piece of non-metallic material 29 has been described as being sized to be snugly fit to the slit 28 and being inserted into the slit in the illustrated embodiment, the present invention is not limited thereto.

In embodiments shown in FIGS. 1 to 3, the rear cover 22 may be a plate in which the metal plates 26 and 27 and the piece of electrically non-conductive non-metallic material 29 are integrated. In another embodiment, the metal plates 26 and 27 and the piece of electrically non-conductive material 29 of the rear cover 22 may be formed integrally with portions constituting sidewalls of the housing 18 to enhance strength of the rear cover. The sidewalls of the housing may be made of an electrically non-conductive material or a metal. This rear cover 22 may be configured such that it can be opened and closed or cannot be easily detached by a user. Any portion or component may be referred to as a rear cover so far as it can cover the internal components, provide the backside of the smartphone and constitute a part of the housing, regardless of whether it can be opened and closed.

In the embodiments shown in the figures, the metal plate 27 is shown as extending from the slit to a lower end 181 of the smartphone. However, the present invention is not limited thereto, and the metal plate 27 may extend to a position spaced apart from the lower end of the smartphone, and a portion from that position to the lower end of the smartphone may be covered with a non-metallic piece. In this case, it may be helpful to communication of another antenna 19a of the smartphone.

When the rear cover 22 is assembled in the smartphone, the metal plates 26 and 27 may be in an insulated state without being electrically connected to each other. In another embodiment, the metal plates 26 and 27 may be electrically connected to each other, and both of them may be connected to a ground of the smartphone circuit.

Material of Rear Cover

In the illustrated embodiment, the metal plates 26 and 27 are electrically conductive and are made of a non-ferromagnetic metal. For example, the metal plates 26 and 27 may be made of aluminum or an aluminum alloy material. However, the present invention is not limited thereto. In other examples, the metal plates 26 and 27 may be made of copper, tin, titanium, a copper alloy, a tin alloy or a titanium alloy. Although such an electrically conductive metallic material may be likely to hinder propagation of radio waves due to generation of an eddy current, it does not greatly change a path of magnetic flux formed in the air since the electrically conductive metallic material is a non-ferromagnetic material.

Meanwhile, the cover piece 29 is made of a substantially electrically non-conductive material. The cover piece 29 may also be made of a non-ferromagnetic and electrically non-conductive material. For example, the cover piece 29 may be made of a polymeric plastic material, although the present invention is not limited thereto.

Slit

Figure 7:
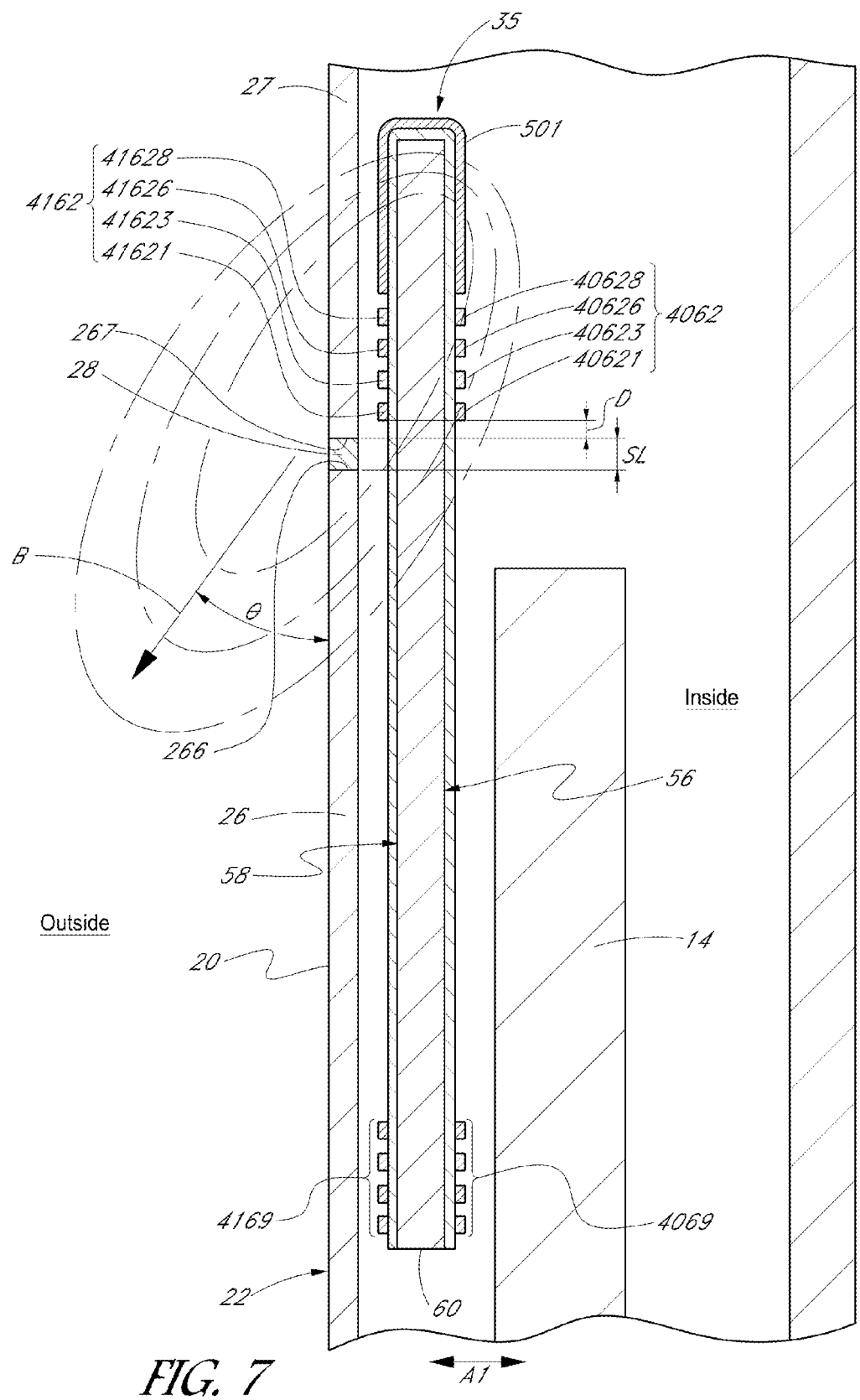
FIG. 7 is a sectional view of a portion of a smartphone according to embodiments of the present invention, showing a rear cover, a battery and an NFC antenna in the smartphone.

As shown in FIGS. 2, 3 and 7, the metal plates 26 and 27 are spaced apart from each other by a predetermined distance. Although a portion between the metal plates is covered or filled with an electrically non-conductive non-metallic piece 29, this portion is referred to as a slit herein. The metal plate 26 has a first edge 266, and the metal plate 27 has a second edge 267. The first edge 266 and the second edge 267 are disposed to face each other. The distance between the edges is a width SL of the slit (see FIG. 7). The width SL of the slit may be about 1 to about 10 mm. In an embodiment, the width SL of the slit may be about 0.5 mm, about 1 mm, about 1.5 mm, about 2 mm, about 2.5 mm, about 3 mm, about 3.5 mm, about 4 mm, about 4.5 mm, about 5 mm, about 6 mm, about 7 mm, about 8 mm, about 10 mm, about 12 mm, about 1 mm, about 13 mm, about 15 mm or about 20 mm. In another embodiment, the width SL of the slit may be a numerical value within a range determined by two numerical values selected from the numerical values listed above.

In the embodiments shown in FIGS. 2 and 3, the slit is formed across the entire width of the smartphone. Referring to FIG. 24, in another embodiment, the slit may be shorter than the entire width of the smartphone. In this case, the metal plates 26 and 27 may be formed into a unitary plate with the metal plates connected integrally with each other. The rear cover constructed as such may be applied to all other embodiments described herein.

Arrangement of Antenna with Respect to Location of Slit

Since most of the rear cover 22 covering the NFC antenna is formed of the metal plates 26 and 27 as described above, the metal plates 26 and 27 may affect radio waves generated and radiated from the NFC antenna or radio waves transferred to the NFC antenna. One of methods of minimizing such influences is to arrange the antenna at a specific position with respect to the slit 28. If the width of the slit 28 is further increased, the effects of the metal plates 26 and 27 on the transfer of the radio waves of the antenna are reduced. However, there is limitation on the increase of the width of the slot since several advantages obtained by using the metal plates may be diminished. Accordingly, embodiments shown in several figures propose antennas having new configurations. In addition, the NFC antenna is aligned with respect to the slit disposed between the metal plates. In this manner, the effects of the metal plates on the radio waves radiated from the NFC antenna are reduced or minimized even while using the metal plates, which is further discussed below.

Slit and Location of Antenna

In the embodiments shown in FIG. 3, with respect to a center line CL of the smartphone 10 in a longitudinal direction L1, the slit 28 is disposed much closer to the end 181 of the smartphone 10 in the longitudinal direction L1 than the center line CL. In an embodiment, the distance Dc between the end 181 and the edge 267 may be about 10 mm or more. In another embodiment, the distance Dc may be about 3 mm, about 5 mm, about 6 mm, about 7 mm, about 8 mm, about 9 mm, about 10 mm, about 12 mm, about 14 mm, about 15 mm, about 17 mm, about 19 mm, about 20 mm, about 22 mm, about 25 mm, about 30 mm, about 35 mm, about 40 mm, about 50 mm or about 60 mm. In a further embodiment, the distance Dc may be a numerical value within a range determined by two numerical values selected from the numerical values listed above.

Meanwhile, the distance Dc may be about 1/10 of a distance Da between the end 181 and the center line CL. In another embodiment, the distance Dc may be about 1/20, about 1/15, about 1/12, about 1/9, about 1/8, about 1/7, about 1/6, about 1/5, about 1/9, about 1/4 or about 1/2 of the distance Da. In a further embodiment, the distance Dc may be a numerical value within a range determined by two numerical values selected from the numerical values listed above in comparison with the distance Da.

In the illustrated embodiment, the location of the NFC antenna 35 is determined relative to the slit 28. A distance Dd between the end 181 and a first edge of the NFC antenna 35 is smaller than the distance Dc between the end 181 and the slit 28. On the other hand, a distance Db between the end 181 and a second edge of the NFC antenna 35 is smaller than the distance Da between the end 181 and the center line CL. However, the present invention is not limited thereto. In an embodiment, the distance Db may be smaller than about 1/2 of the distance Da. In another embodiment, the distance Db may be about 2/3 or more of the distance Da.

NFC Antenna

According to embodiments of the present invention, as shown in FIGS. 4 to 8, the NFC antenna 35 is a module with several structures combined thereinto. The NFC antenna 35 includes a core 52 of a magnetic material and an antenna coil sheet 32 configured to cover the core. In the illustrated embodiments, the magnetic core 52 includes a generally rectangular main body 524 and a protrusion 525 protruding from the main body 524. The antenna coil sheet 32 covers a first surface 56 of the magnetic core (a surface facing the battery when the antenna is assembled in the smartphone; see FIG. 7), a second surface 56 of the magnetic core (a surface opposite to the first surface 56 and facing the rear cover; see FIG. 7), and the protrusion of the magnetic core.

Figure 6A:
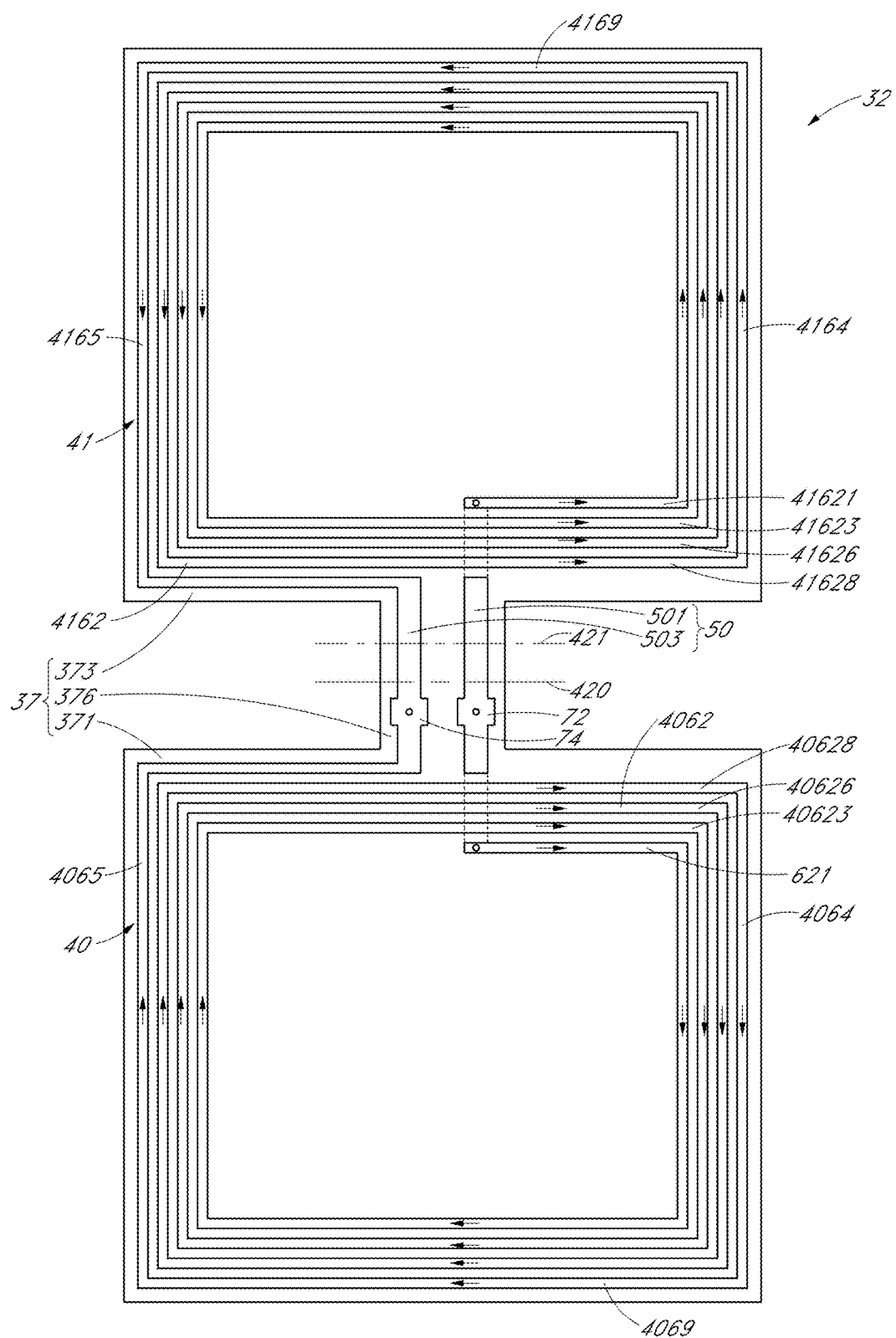
FIG. 6A is a view showing an unfolded state of an antenna coil sheet of the NFC antenna shown in FIG. 4.

When the antenna coil sheet 32 is shown in an unfolded state for better understanding, as shown in FIG. 6a, the antenna coil sheet has first and second coils 40 and 41 coiled multiple times in the form of loops on a substrate 37 and has two connection lines 501 and 503 connecting the first coil 40 and the second coil 41. In the illustrated embodiment, the substrate 37 is an insulation material sheet and has first and second rectangular coil supports 371 and 372 and a neck portion 376 disposed between the coil supports to connect them. The first coil 40 is disposed on the first coil support, and the second coil 41 is disposed on the second coil support. The connection lines 501 and 503 are disposed in the neck portion, and the neck portion is provided with pads 72 and 74.

Figure 4:
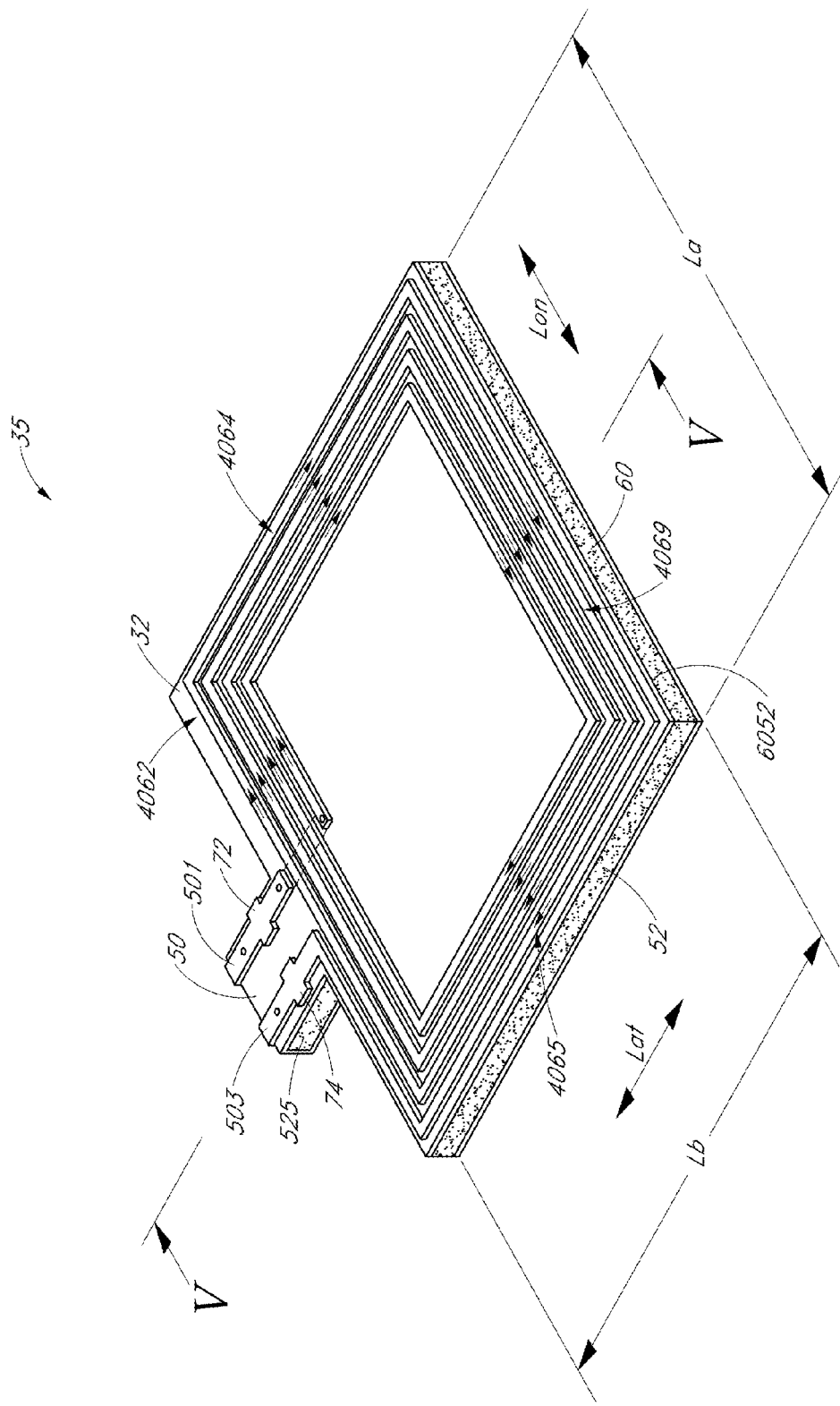
FIG. 4 is a perspective view of an NFC antenna according to embodiments of the present invention.
Figure 5A:
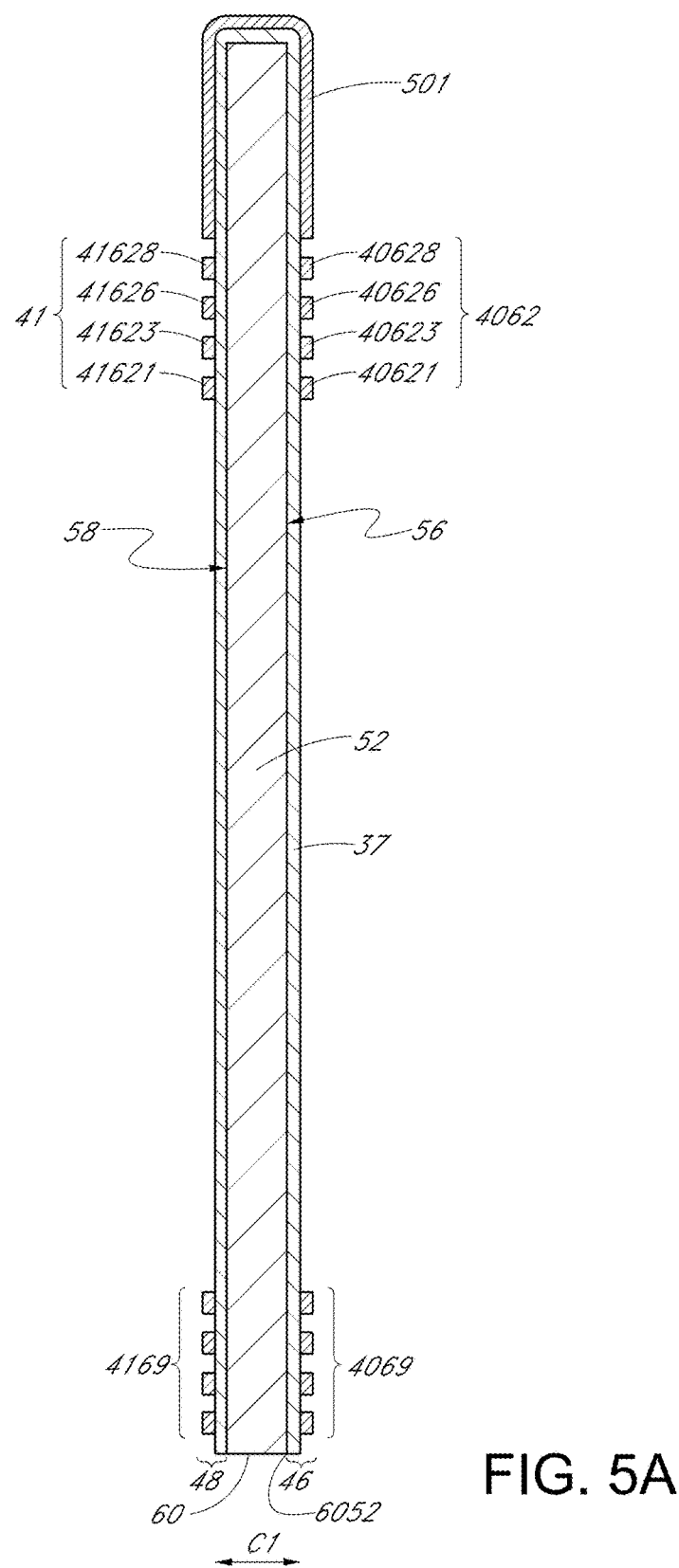
FIG. 5A is a sectional view of the NFC antenna shown in FIG. 4.

When the antenna coil sheet 32 is folded along imaginary folding lines 420 and 421 at the neck portion 376, the antenna coil sheet 32 forms a first layer 46 and a second layer 48 as shown in FIGS. 4 and 5a, and a connection portion 50 makes a connection between the first layer 46 and the second layer 48. The ferromagnetic core 52 is interposed between the first layer 46 and the second layer 48.

In embodiments shown in FIG. 4, the NFC antenna 35 is generally rectangular except the protrusion 525 of the magnetic core and the connection portion 50 of the coil sheet. Although the NFC antenna has a rectangular shape with a length La of a side in a longitudinal direction greater than a length Lb of a side in a lateral direction, the present invention is not limited thereto. The NFC antenna may have a square shape with the length La identical to the length Lb or may be a rectangular shape with the length Lb greater than the length La.

The term "longitudinal direction" used herein means a direction parallel to a direction of extension of an edge 6052 where a side surface 60 and the first surface 56 of the magnetic core 52 meet, and a direction perpendicular to the longitudinal direction is referred to as the lateral direction. In embodiments shown in FIG. 4, the longitudinal direction is represented by Lon, and the lateral direction is represented by Lat.

First Antenna Coil and Second Antenna Coil

As seen from FIGS. 4 and 6a, each of the first coil 40 and the second coil 41 forms a loop of a single wire coiled multiple times. Although the coil is shown as being coiled four times, the present invention is not limited thereto. The number of turns of the coil may be three, four, five, six, seven, eight, nine or ten, and a coil with turns can also be used.

Referring to FIGS. 4 and 6a, the first coil 40 has a first longitudinal linear segment 4062, a second longitudinal linear segment 4069, a first lateral linear segment 4064, and a second lateral linear segment 4065. The first lateral linear segment 4064 and the second lateral linear segment 4065 connect corresponding ends of the first longitudinal linear segment 4062 and the second longitudinal linear segment 4069, respectively. Accordingly, in the first coil 40, an electrical current can flow through the first longitudinal linear segment 4062, the first lateral linear segment 4064, the second longitudinal linear segment 4069 and the second lateral linear segment 4065 (see arrows shown on lines in FIGS. 4 and 6a).

The second coil 41 has a first longitudinal linear segment 4162, a second longitudinal linear segment 4169, a first lateral linear segment 4164, and a second lateral linear segment 4165. The first lateral linear segment 4164 and the second lateral linear segment 4165 connect corresponding ends of the first longitudinal linear segment 4162 and the second longitudinal linear segment 4169, respectively. Accordingly, in the second coil 41, an electrical current can flow through the first longitudinal linear segment 4162, the first lateral linear segment 4164, the second longitudinal linear segment 4169 and the second lateral linear segment 4165 (see arrows shown on the lines in FIG. 6a).

In the illustrated embodiment, it is shown that each of the first longitudinal linear segments 4062 and 4162, the first lateral linear segments 4064 and 4164, the second lateral linear segments 4065 and 4165 and the second longitudinal linear segments 4069 and 4169 includes four lines since the number of turns of the coil is four, although the present invention is not limited thereto.

In the illustrated embodiment, although the first longitudinal linear segments 4062 and 4162 and the second longitudinal linear segments 4069 and 4169 are longer than the first lateral linear segments 4064 and 4164 and the second lateral linear segments 4065 and 4165, the present invention is not limited thereto. Alternatively, the first longitudinal linear segments 4062 and 4162 and the second longitudinal linear segments 4069 and 4169 may be substantially equal to or substantially shorter than the first lateral linear segments 4064 and 4164 and the second lateral linear segments 4065 and 4165 in length. In the illustrated embodiment, although the lines of the first longitudinal linear segments 4062 and 4162 and the second longitudinal linear segments 4069 and 4169 are shown as straight lines generally parallel to the edge 6052 of the magnetic core 52, the present invention is not limited thereto. Although the lines of the first lateral linear segments 4064 and 4164 and the second lateral linear segments 4065 and 4165 are shown as straight lines generally perpendicular to the edge 6052 of the magnetic core 52, the present invention is not limited thereto. Alternatively, the longitudinal lines and/or the lateral lines of the first antenna coil and the second antenna coil may be curved lines (e.g., curved lines having large radii of curvature). Furthermore, the longitudinal lines may not be completely parallel to the edge 6052 of the magnetic core 52, and the lateral lines may not be completely perpendicular to the edge 6052 of the magnetic core 52.

In the illustrated embodiment, when the antenna coil sheet 32 is unfolded as shown in FIG. 6a, coiling directions of the first coil 40 and the second coil 41 are opposite to each other. In FIG. 6a, the coiling direction from the inside to the outside in the first coil 40 is represented in a counterclockwise direction, and the coiling direction from the inside to the outside in the second coil 41 is represented in a clockwise direction. However, after folding the antenna coil sheet 32 along the folding lines 420 and 421 as shown in FIGS. 5A and 7, the coiling directions are identical to each other when viewed in a direction perpendicular to the first surface 56 of the magnetic core (a direction of arrow C in FIG. 5A, or a direction of arrow A in FIG. 7 or a direction opposite thereto).

The connection portion 50 is provided with a first connection line 501 connecting an inner end of the first coil 40 and an inner end of the second coil 41, and a second connection line 503 connecting an outer end of the first coil 40 and an outer end of the second coil 41. The connection line 503 and the inner end of the first coil 40 are connected through a via passing through the substrate 37 below the inner end, through a connection line provided on a backside of the substrate (a portion shown in a dotted line) and through a via passing through the substrate 37 back toward the second connection line 503. The connection line 503 and the inner end of the second coil 41 are also connected through a via passing through the substrate 37 below the inner end, through a connection line provided on the backside of the substrate (a portion shown in a dotted line) and through a via passing through the substrate 37 back toward the second connection line 503.

Figure 6C:
FIGS. 6B and 6C are schematic circuit diagrams showing examples of connection of coils.
Figure 6B:
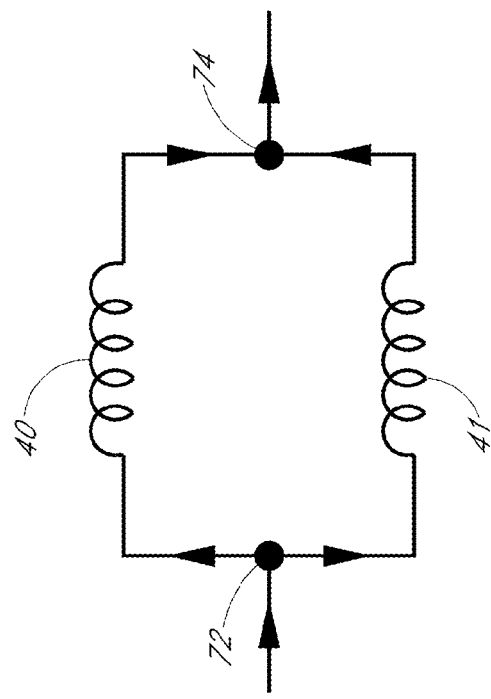

As described above, when the first coil 40 and the second coil 41 are connected through the first connection line 501 and the second connection line 503 and the pads 72 and 74 are placed on the first and second connection lines 501 and 503, respectively, to be used as signal input/output pads, the first and second coils are connected in parallel. Referring to FIG. 6B showing the connection of the first coil 40 and the second coil 41 in a schematic circuit, it can be understood that a signal input into the antenna through the pad 72 is divided, and the divided signals flow respectively through the first coil 40 and the second coil 41, then gather together at the pad 74, and go out of the antenna. At this point, this can be distinguished from a series connection in which, as schematically shown in FIG. 6c, a signal is input into the antenna through a pad 72', then sequentially passes through two coils 40' and 41', and goes out of the antenna through a pad 74'.

In the illustrated embodiment, the first coil 40 and the second coil 41 are connected in parallel and the coils are stacked as shown in FIGS. 4, 5a, 7 and 8, whereby the antenna 35 becomes a parallel stacked antenna.

In the completed antenna shown in FIGS. 4, 5a, 7 and 8, the lines of the first longitudinal linear segment 4062 of the first coil 40 and the lines of the first longitudinal linear segment 4162 of the second coil 41 exactly overlap when viewed in the direction perpendicular to the first surface 56. In the same manner, the lines of the second longitudinal linear segment 4069 of the first coil 40 and the lines of the second longitudinal linear segment 4169 of the second coil 41 exactly overlap when viewed in the direction perpendicular to the first surface 56. When viewed in the direction C1 perpendicular to the first surface 56, the lines of the first lateral linear segment 4064 of the first coil 40 and the lines of the first lateral linear segment 4064 and 4164 of the second coil 41 exactly overlap, and the lines of the second lateral linear segment 4065 of the first coil 40 and the lines of the second lateral linear segment 4165 of the second coil 41 exactly overlap. However, the present invention is not limited thereto. In another embodiment, as shown in FIG. 5b, respective lines of first longitudinal linear segments 4062' and 4162' of the first and second coils may be arranged not to overlap with each other, and as shown in FIG. 5c, respective lines of first longitudinal linear segments 4062" and 4162" may be arranged only to partially overlap with each other.

In embodiments shown in FIGS. 4 and 6a, although the length of each of the lines of the longitudinal linear segments 4062, 4162, 4069 and 4169 varies according to the longitudinal length La of the antenna 35, it is about 13 mm to 42 mm. In another embodiment, the length of each of the lines of the first longitudinal linear segments may be about 12 mm, about 13 mm, about 16 mm, about 20 mm, about 22 mm, about 24 mm, about 25 mm, about 26 mm, about 27 mm, about 28 mm, about 29 mm, about 30 mm, about 31 mm, about 32 mm, about 33 mm, about 34 mm, about 36 mm, about 38 mm, about 40 mm, 42 mm or about 43 mm. In a further embodiment, the length of each of the lines of the longitudinal linear segments may be a numerical value within a range determined by two numerical values selected from the numerical values listed above.

In an embodiment, the width of each line is 0.1 mm to 1 mm. In another embodiment, the width may be about 0.1 mm, about 0.2 mm, about 0.3 mm, about 0.4 mm, about 0.45 mm, about 0.5 mm, about 0.55 mm, about 0.6 mm, about 0.65 mm, about 0.7 mm, about 0.8 mm, about 0.9 mm or about 1 mm. In a further embodiment, the width of each of the lines of the longitudinal linear segments may be a numerical value within a range determined by two numerical values selected from the numerical values listed above. If the width of the line is too large, a resistance is decreased but it is difficult to increase the number of turns, whereas if the width of the line is too small, the resistance is increased and may affect performance of the antenna.

In an embodiment, the thickness of each line is about 8 μm to 40 μm. In another embodiment, the thickness of the line may be about 8 μm, about 10 μm, about 11 μm, about 12 μm, about 13 μm, about 15 μm, about 17 μm, about 20 μm, about 22 μm, about 25 μm, about 27 μm, about 30 μm, about 35 μm or about 40 μm. In a further embodiment, the thickness of the line may be a numerical value within a range determined by two numerical values selected from the numerical values listed above.

In an embodiment, a gap G1 between the lines of the longitudinal linear segments is about 0.05 mm to 0.8 mm. In another embodiment, the gap G1 between the lines may be about 0.05 mm, about 0.1 mm, about 0.15 mm, about 0.2 mm, about 0.25 mm, about 0.3 mm, about 0.35 mm, about 0.4 mm, about 0.45 mm, about 0.5 mm, about 0.6 mm, about 0.7 mm or about 0.8 mm. In a further embodiment, the gap between the lines of the longitudinal linear segments may be a numerical value within a range determined by two numerical values selected from the numerical values listed above. If the gap between the lines is decreased, the number of turns is increased but there may be a defect of adhesion of the lines to each other in a manufacturing process, whereas if the gap between the lines is too small, it is difficult to achieve a large number of turns.

Supply of Electrical Current

In the illustrated embodiments, the pads 72 and 74 or terminals are provided respectively in the middle of the first connection line 501 and the second connection line 503 to connect the NFC antenna to an NFC circuit housed in the smartphone. A signal is supplied to the coils 40 and 41 through the pads or terminals. Although an example in which the pads 71 and 74 are disposed closer to the first coil 40 is shown in the illustrated figures, the present invention is not limited thereto.

In the illustrated embodiment, the first coil 40 and the second coil 42 are coiled in the same direction, so that an electrical current supplied through the pads 72 and 74 flows through connection portions, for example, through the first longitudinal linear segment 4062, the first lateral linear segment 4064, the second longitudinal linear segment 4069, the second lateral linear segment 4065 and again the first longitudinal linear segment 4062 in the first coil 40, and through the first longitudinal linear segment 4162, the first lateral linear segment 4164, the second longitudinal linear segment 4169, the second lateral linear segment 4165 and again the first longitudinal linear segment 4162 in the second coil 41.

Figure 23:
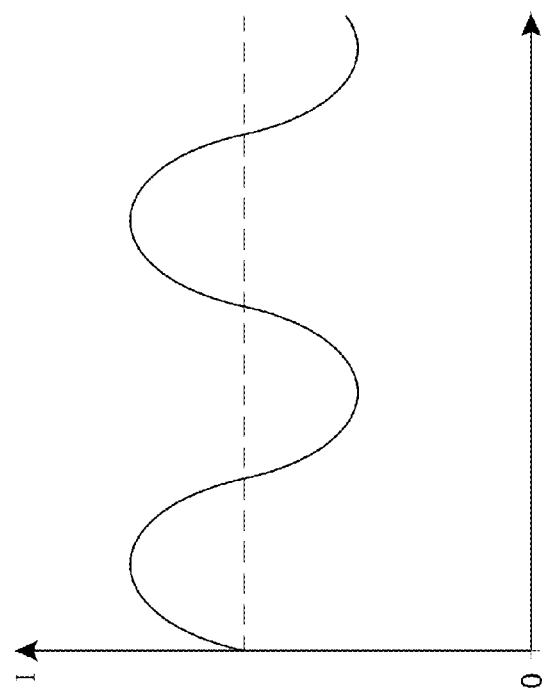
FIG. 23 shows an electrical current signal supplied to an NFC antenna according to embodiments of the present invention.

FIG. 23 shows a waveform of the electrical current supplied to the antenna. As shown in the figure, the frequency of the electrical current waveform conforms to standards of near field communication, maximum and minimum values of the magnitude of the electrical current are values larger than zero, and the electrical current is supplied to consistently flow in a constant direction even though its magnitude is changed. However, the present invention is not limited thereto. Although the electrical current flows in the directions of the arrows in embodiments shown in FIG. 6*a*, the electrical current may flow in directions opposite thereto.

In the NFC antenna 35 according to embodiments shown in FIGS. 4 to 8, when viewed in the direction C1 perpendicular to the first surface, the coiling directions are identical to each other. However, the present invention is not limited thereto. In another embodiment, when viewed in the direction C1 perpendicular to the first surface, the coiling directions may be different from each other. For example, the first coil may be configured to be coiled in the counterclockwise direction when the coil is coiled from the outside to the inside, and the second coil may be configured to be coiled in the clockwise direction when the coil is coiled from the outside to the inside. However, even in such a configuration, if an electrical current flows through the first coil and the second coil in the same direction when viewed in the direction perpendicular to the first surface, the NFC antenna provides the same function of the parallel stacked antenna as that of embodiments shown in FIGS. 4 to 8.

Shape and Material of Magnetic Core

Although the magnetic core 52 is entirely made of a magnetic material in the illustrated embodiment, the present invention is not limited thereto. The material of the magnetic core is a ferromagnetic material, and for example, the core 52 is made of a material such as ferrite. However, the present invention is not limited thereto, and in another embodiment, a ferromagnetic metallic material such as electrical steel may be used.

In an embodiment, the thickness of the magnetic core (a distance between the first surface and the second surface) is about 35 μm to 120 μm. In another embodiment, the thickness of the magnetic core may be about 32 μm, about 35 μm, about 40 μm, about 44 μm, about 50 μm, about 60 μm, about 65 μm, about 70 μm, about 75 μm, about 80 μm, about 83 μm, about 86 μm, about 90 μm, about 95 μm, about 100 μm, about 110 μm, about 120 μm, about 125 μm or about 128 μm. In a further embodiment, the thickness of the magnetic core may be a numerical value within a range determined by two numerical values selected from the numerical values listed above.

Size of Antenna

Since the antenna has the parallel stacked structure as described above, the size thereof can be decreased as compared with those of other NFC antennas. Referring to FIG. 4, in the antenna 35 according to the embodiment, the longitudinal length La is about 15 mm to 45 mm, and the lateral length Lb is about 10 mm to 35 mm. In another embodiment, the longitudinal length La may be about 13 mm, about 15 mm, about 16 mm, about 20 mm, about 23 mm, about 25 mm, about 27 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 42 mm, about 44 mm, about 45 mm, about 47 mm or about 50 mm. In a further embodiment, the longitudinal length La may be a numerical value within a range determined by two numerical values selected from the numerical values listed above.

Moreover, in an embodiment, the lateral length Lb may be about 8 mm, about 10 mm, about 11 mm, about 14 mm, about 16 mm, about 18 mm, about 20 mm, about 21 mm, about 22 mm, about 23 mm, about 24 mm, about 25 mm, about 26 mm, about 27 mm, about 28 mm, about 29 mm, about 30 mm, about 32 mm, about 34 mm, about 36 mm, about 35 mm or about 40 mm. In a further embodiment, the lateral length Lb may be a numerical value within a range determined by two numerical values selected from the numerical values listed above. However, the present invention is not limited thereto.

Arrangement of Antenna in Smartphone

Generally, when the magnetic core does not exist in the vicinity of the antenna coil, magnetic field lines coming out from the antenna wire generally draw a circle around the wire though which an electrical current flows, and radio waves coming out from the wire radiate at a generally identical intensity in all directions. However, when the magnetic core exists in proximity with the antenna coil, the magnetic field lines are distorted by effects of the magnetic core, and the distortion results in a relatively intensive portion in the radio waves.

Meanwhile, when a conductor such as a metal exists in proximity with the antenna coil, propagation of the radio waves of the antenna is hindered. Accordingly, it is preferable that an electrically conductive metal is not disposed in proximity with the antenna, although the radio waves of the antenna are difficult to avoid effects of neighboring metal components in a product in which various kinds of components are densely populated like a smartphone. In the smartphone, metal components significantly affecting an operation of the antenna are the battery and the rear cover of a metallic material.

Meanwhile, the effects of the metal components (e.g., the battery) may be changed by arranging the magnetic core in proximity with the antenna coil. For example, a portion of the coil is greatly hindered by the metal components in radiating the radio waves, depending on the arrangement of the antenna coil, the magnetic core and the battery, although the other portions of the coil may not be significantly affected by the metal components in radiating the radio waves.

Figure 8:
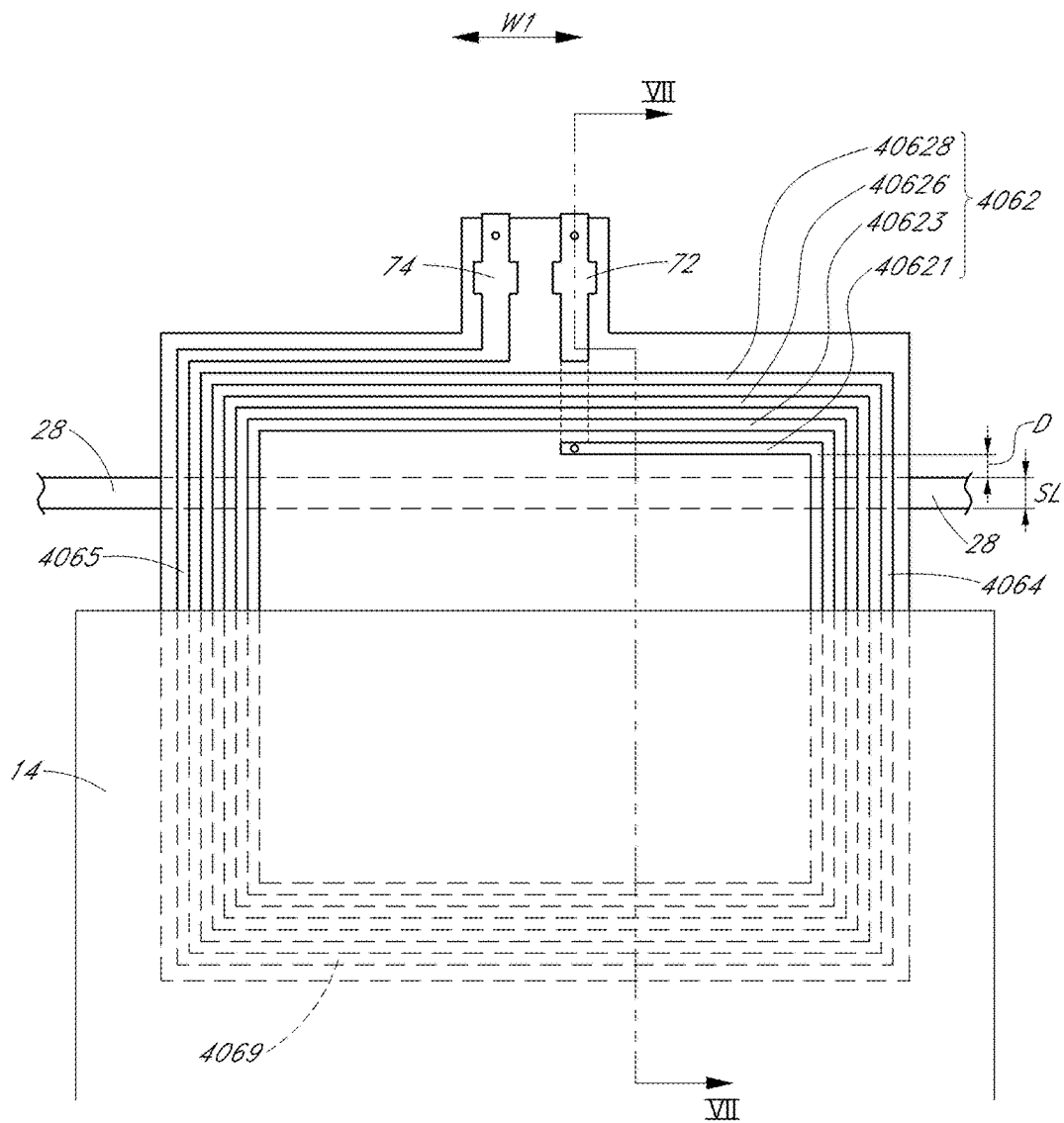
FIG. 8 is a view illustrating the rear cover and the NFC antenna of the smartphone shown in FIG. 7, when viewed from the inside of the smartphone toward the outside thereof.

Accordingly, in embodiments shown in FIGS. 7 and 8, the parallel stacked antenna 35 having the structure as described above, the slit 28 of the rear cover 22 mainly made of a metal and the battery 14 are arranged to be disposed at specific locations with respect to one another. Therefore, the radio waves from the antenna 35 are effectively radiated to the outside of the smartphone. In addition, the antenna 35 may have directivity so that the radio waves may propagate most intensively in a specific direction (e.g., a direction of arrow B in FIG. 7). Then, a user moves the smartphone such that an NFC device is placed in the direction of the most intensive radio waves, whereby the NFC device may effectively communicate with the smartphone and the antenna 35.

Positional Relationship Between Slit of Rear Cover and Antenna

In embodiments shown in FIGS. 7 and 8, the antenna 35 is arranged inward with respect to the rear cover 22 such that the backside of the smartphone is generally parallel to the first surface 56 of the magnetic core. Accordingly, a direction A1 perpendicular to the backside of the smartphone generally corresponds to the direction C1 perpendicular to the first surface 56 of the magnetic core 52.

Furthermore, in the illustrated embodiment, when viewed in the direction A1 perpendicular to the backside, the first longitudinal linear segments 4062 and 4162 are arranged to overlap with the metal plate 27, and the second longitudinal linear segments 4069 and 4169 are arranged to overlap with the metal plate 26. Most of the first lateral linear segments 4064 and 4164 and the second lateral linear segments 4065 and 4165 overlap with the metal plate 26. In the illustrated embodiment, the lines of the first longitudinal linear segments 4062 and 4162 extend in the width direction W (see FIGS. 3 and 8) of the smartphone 10 and generally parallel to the slit 28 (or the edges 266 and 267).

In addition, in the illustrated embodiments, when viewed in the direction A1 perpendicular to the backside, the first longitudinal linear segments 4062 and 4162 are disposed between the slit 28 and the lower end of the smartphone 10, and the second longitudinal linear segments 4069 and 4169 are arranged to overlap with the metal plate 26.

Referring to FIGS. 7 and 8, when viewed in the direction A1 perpendicular to the backside, all the lines 40621, 40623, 40626 and 40628 of the first longitudinal linear segment 4062 and all the lines 41621, 41623, 41626 and 41628 of the first longitudinal linear segment 4162 are disposed to overlap with the metal plate 27 in the illustrated embodiment. When viewed in the direction perpendicular to the backside, the innermost lines 40621 and 41621 among the lines are spaced apart from the first edge 266 of the metal plate 27 by a predetermined distance D. In an embodiment, the distance D may be generally identical to the width SL of the slit (the distance between the first edge 266 of the metal plate 26 and the second edge 267 of the metal plate 27). In another embodiment, a ratio of the distance D to the width SL of the slit, i.e., D/SL, may be about 0.1, about 0.2, about 0.4, about 0.5, about 0.8, about 1.2, about 1.4, about 1.6, about 1.8, about 2.0, about 2.4, about 3.0, about 3.5, about 4.0, about 4.5, about 5.0, about 5.5, about 6.0, about 10, about 15 or about 30. In a further embodiment, the ratio of the distance D to the width SL of the slit may be a numerical value within a range determined by two numerical values selected from the numerical values listed above.

Meanwhile, the larger the distance from the metal plates 26 and 27 to the lines of the second layer of the antenna 35 is, the thicker the smartphone is. Accordingly, in an embodiment, the antenna 35 is arranged to almost contact with the rear cover 22. Since a short circuit of an electrical current may occur if the lines directly contact with the metal plates, an insulation material may be coated on the coils 40 and 41.

In the embodiments shown in FIGS. 7 and 8, all the lines 40621, 40623, 40626 and 40628 of the first longitudinal linear segment 4062 and all the lines 41621, 41623, 41626 and 41628 of the first longitudinal linear segment 4162 have been described as being offset from the slit 28. However, the present invention is not limited thereto. In another embodiment, when viewed in the direction A1 perpendicular to the backside, the location of the antenna 35 may be determined such that the lines 40621 and 41621 overlap with the slit 28. In a further embodiment, the lines 40621 and 41621 may be configured to overlap with the metal plate 26, the lines 40623 and 41623 may be configured to overlap with the slit 28, and the other lines 40626, 40628, 41626 and 41628 may be configured to overlap with the metal plate 27. As a result, in embodiments described above, the antenna 35 is arranged such that at least one of the lines (e.g., the line 40628 or 41628) of the first longitudinal linear segments 4062 and 4162 overlaps with the metal plate 27 when viewed in the direction A1 perpendicular to the backside. Such a modified embodiment may also be applied to other antenna arrangement structures to be described below.

In the illustrated embodiments, it is shown that the first longitudinal linear segments 4062 and 4162 and the connection portion 50 are completely covered by the metal plate 27. However, the present invention is not limited thereto. In another embodiment, the metal plate 27 may be sized such that it completely covers the first longitudinal linear segments but does not cover the connection portions, when viewed in the direction A1 perpendicular to the backside. In a further embodiment, the size of the metal plate 27 may be so small that the metal plate 27 does not completely cover the first longitudinal linear segments and covers only some of the lines when viewed in the direction A1 perpendicular to the backside. For example, the metal plate 27 may be sized such that it covers the lines 40621, 40623, 41621 and 41623 but does not cover the lines 40626, 40628, 41626 and 41628. In an embodiment, the width of the metal plate 27 (a distance measuring a gap between one edge 267 and another edge of the metal plate 27 in the direction L1 perpendicular to the width direction W1 of the smartphone as shown in FIGS. 3 and 8) may be about 10 mm or more. In another embodiment, the width of the metal plate 27 may be about 5 mm, about 6 mm, about 7 mm, about 8 mm, about 9 mm, about 10 mm, about 12 mm, about 14 mm, about 15 mm, about 17 mm, about 19 mm, about 20 mm, about 22 mm, about 25 mm, about 30 mm and about 35 mm. In a further embodiment, the width of the metal plate 27 may be a numerical value within a range determined by two numerical values selected from the numerical values listed above.

Location of Battery

In embodiments shown in FIGS. 7 and 8, the battery 35 is arranged on a further inward side with respect to the antenna 35. Accordingly, the battery 14 is farther from the rear cover than the antenna 35. In addition, when viewed in the direction A1 perpendicular to the backside, the battery 14 is arranged to overlap with a portion of the antenna 35. Accordingly, at least a part of the antenna 35 is disposed between the rear cover 22 and the battery 14. In a positional relationship between the battery and the antenna 35, the battery 14 is arranged to overlap with the metal plate 26, but not to overlap with the slot 28 or the metal plate 27, when viewed in the direction A1 perpendicular to the backside.

In the embodiments shown in FIGS. 7 and 8, when viewed in the direction A1 perpendicular to the backside, the first longitudinal linear segments 4062 and 4162 do not overlap with the battery 14 and are spaced apart from the battery 14. Accordingly, radio waves generated from the first longitudinal linear segments 4062 and 4162 are not significantly affected by the battery 14.

Meanwhile, as easily understood from FIG. 8, the second longitudinal linear segments 4069 and 4169 overlap with the battery 14 when viewed in the direction A1 perpendicular to the backside. In the illustrated embodiment, a considerable portion (at least a half) of the first lateral linear segments 4064 and 4164 and the second lateral linear segments 4065 and 4165 overlap with the battery 14. As a result, the entire second longitudinal linear segments 4069 and 4169 and most of the first lateral linear segments 4064 and 4164 and the second lateral linear segments 4065 and 4165 are interposed between the metal plate 26 and the battery 14. Accordingly, radio waves generated from the second longitudinal linear segments 4069 and 4169, the first lateral linear segments 4064 and 4164 and the second lateral linear segments 4065 and 4165 are significantly affected by the battery 14 and the metal plate 26, and there is limitation on radiation of the radio waves to the outside. However, the present invention is not limited thereto, and the battery may be arranged such that most or all of at least one of the two lateral linear segments 4064 and 4065 or 4164 and 4165 may not overlap with the battery 14 when viewed in the direction A1 perpendicular to the backside.

Radiation of Radio Waves from Antenna

As described above, the effects of the battery 14 on the radio waves radiated from the first longitudinal linear segments 4062 and 4162 are minimized. Further, since relative locations of the first longitudinal linear segments 4062 and 4162 with respect to the slot 28 are set as described above, the radio waves radiated from first longitudinal linear segments 4062 and 4162 may be radiated to the outside of the metallic rear cover 22. Moreover, since the first longitudinal linear segment 4062 of the first coil 40 and the first longitudinal linear segment 4162 of the second coil 41 are stacked with the magnetic core 52 interposed therebetween, the effects of the battery can be minimized, and intensities of the radio waves can be increased. With one, two or all of the features in this configuration, radio waves capable of accomplishing wireless communications specified in NFC standards can be radiated from the antenna 35 to the outside of the smartphone.

The radio waves coming out from the antenna is most intensively radiated generally in a direction indicated by an arrow B as shown in FIG. 7 according to the configurations such as the location of the slit, the locations of the longitudinal linear segments and the location of the battery. The inventors found that the intensity of the radio waves is sufficient to communicate with an NFC device.

An angle θ defined by the direction of the arrow B and the backside of the smartphone is about 30° to 88° in an embodiment. In another embodiment, the angle θ may be about 25°, about 30°, about 35°, about 45°, about 50°, about 55°, about 60°, about 63°, about 65°, about 67°, about 69°, about 70°, about 72°, about 73°, about 74°, about 75°, about 77°, about 79°, about 80°, about 82°, about 83°, about 85°, about 87°, about 88° or about 89°. In a further embodiment, the angle θ may be an angle within a range of two numerical values selected from the numerical values listed above.

Furthermore, a position where a magnetic field strength H generated by the supply of an electrical current signal has a maximum value among positions on the rear cover is a point between the first edge 266 and the second edge 267 or a point in proximity with the first edge 266 on the metal plate 26. In an embodiment, this point where the magnetic field strength H has a maximum value may be a point at a distance within about ten times of the width SL of the slit from the first edge 266. In another embodiment, this point where the magnetic field strength H has a maximum value may be a point within about 10 mm from the first edge 266. In a further embodiment, this point where the magnetic field strength H has a maximum value may be a point within about 5 mm, about 7 mm, about 9 mm, about 11 mm, about 12 mm, about 15 mm, about 20 mm, about 25 mm, about 28 mm, about 30 mm or about 35 mm from the first edge 266. In a further embodiment, this point where the magnetic field strength H has a maximum value may be a point within a distance spaced apart by a specific numerical value within a range determined by two numerical values selected from the numerical values listed above.

Accordingly, if a user desires to exchange information by performing communication between a smartphone and an NFC device, the communication is performed by approaching the backside of the smartphone, particularly, the portion where the slit is disposed, sufficiently close to the NFC device. Accordingly, the slit 28 may be formed to be distinguished from the metal plates 26 and 27 so that the user may easily know the location of the slit. For example, different colors may be used for the metal plates 26 and 27 and the slit 28, or a specific mark may be printed at the location of the slit 28. In addition, effective communication can be achieved by reducing the distance between the smartphone and the NFC device and at the same time, adjusting a posture of the smartphone such that the NFC device may be positioned at a point indicated by the arrow B where the radio waves are radiated most intensively.

Manufacture of Antenna

The antenna 35 shown in FIG. 4 may be manufactured according to the method shown in FIGS. 17A to 17D. In the illustrated embodiments, a substrate 37 is first prepared (FIG. 17A), and coils 40 and 41 and connection lines 501 and 503 are formed on the substrate 37 (FIG. 17B). The coils and the connection lines may be formed by forming an electrically conductive metallic material layer on the substrate 37 and subsequently performing etching on the layer. After the formation of the coils and the connection lines, an insulation material is coated thereon to complete an antenna coil sheet 32. Then, a core 52 is placed on one side (a side where the coil is not formed) of the antenna coil sheet 32 and the antenna coil sheet 32 is folded along folding lines 420 and 421 in a direction of an arrow (FIG. 17c), thereby completing the antenna 35. In such a configuration, the connection lines of the two coils are formed on the substrate 37 together with the coils. Accordingly, a separate connection means penetrating through the magnetic core 52 or the substrate 37 is not needed to be formed to connect the two coils 40 and 41.

Figure 9:
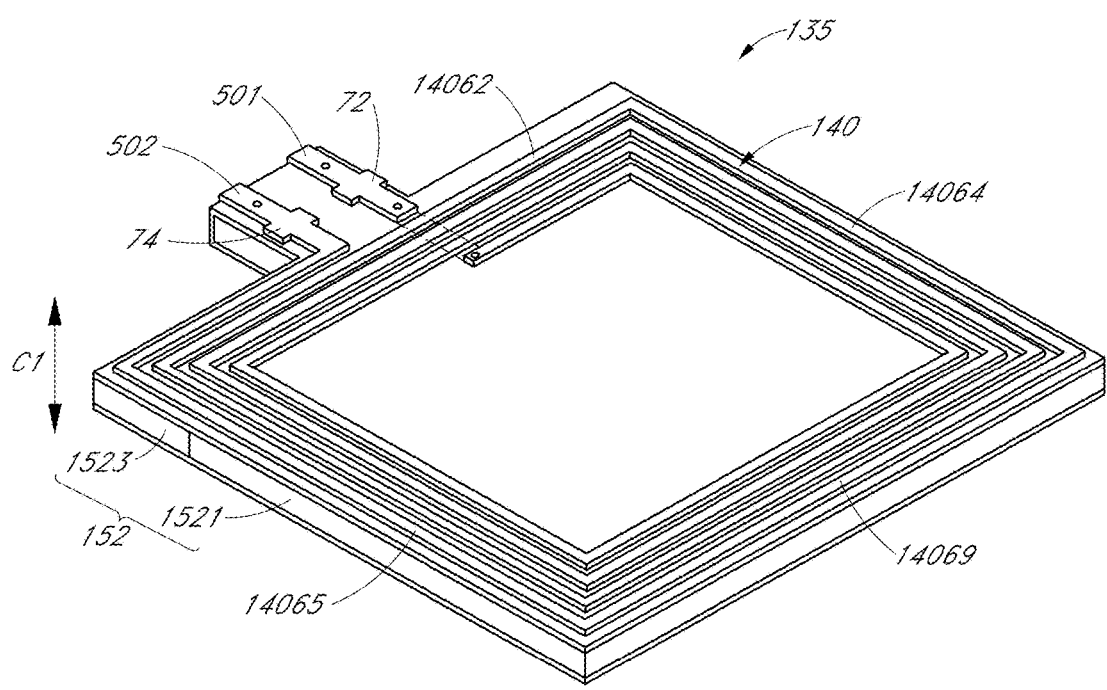
FIG. 9 is a perspective view of an NFC antenna according to embodiments of the present invention.
Figure 10:
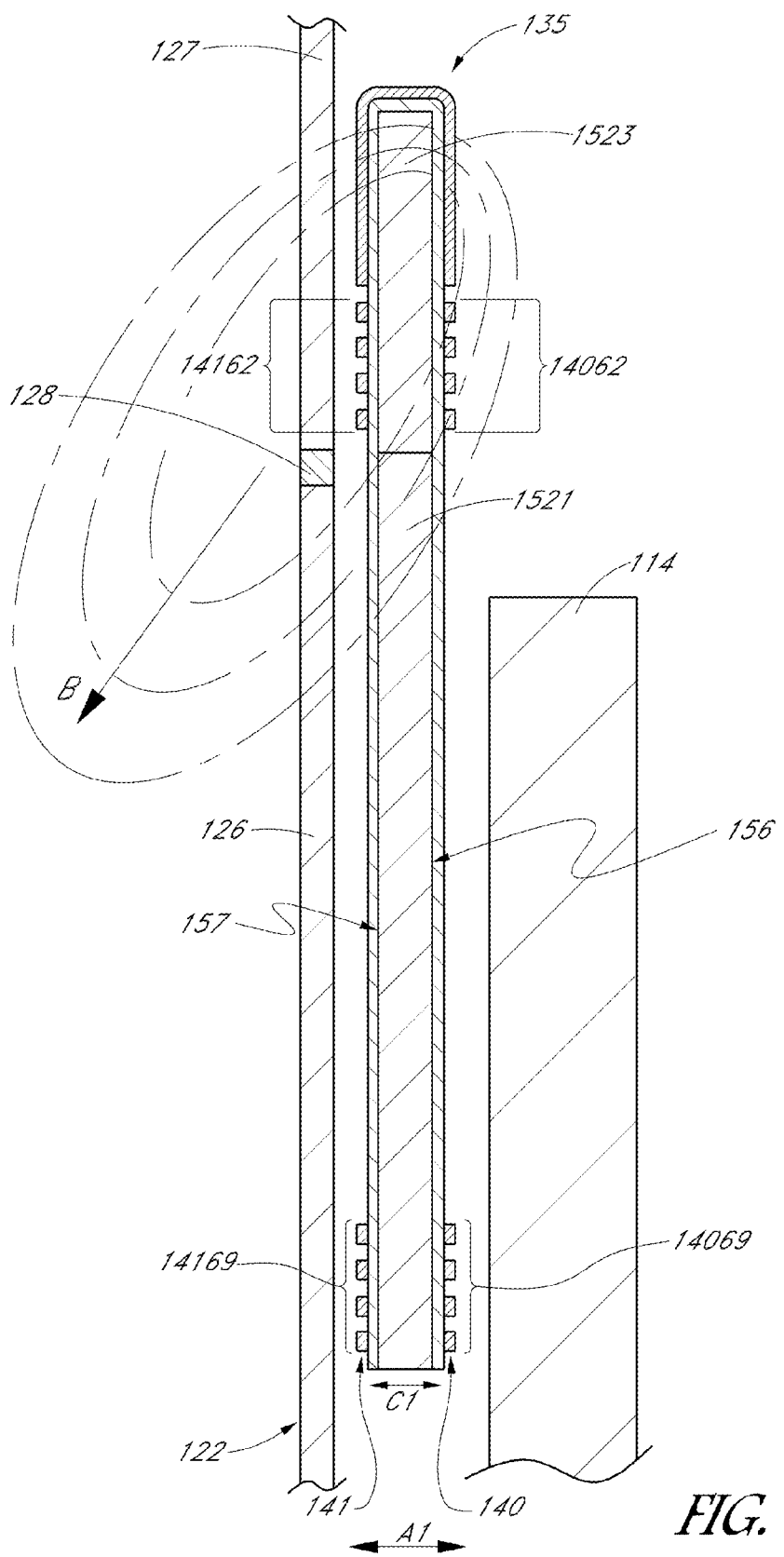
FIG. 10 is a sectional view of a portion of a smartphone according to embodiments of the present invention, showing a rear cover, a battery and the NFC antenna shown in FIG. 9 in the smartphone.

Embodiment Shown in FIGS. 9 and 10

In embodiments shown in FIGS. 9 and 10, most of an antenna 135 and an arrangement structure are identical to those of the various embodiments described above. However, a configuration of a core 152 interposed between a first coil 140 and a second coil 141 of the antenna 135 is different from that of the antenna 35 shown in FIGS. 4 and 5a.

In the illustrated embodiment, the core 152 has a first portion 1521 made of a magnetic material and a second portion 1523 made of a non-magnetic material. The second portion 1523 is disposed between a first longitudinal linear segment 14062 of the first coil 140 and a first longitudinal linear segment 14162 of the second coil 141. When viewed in the direction C1 perpendicular to the first surface 156, the first portion 1521 of the core overlaps with most of a first lateral linear segment and a second lateral linear segment and all of a second longitudinal linear segment of the first coil 140 and also overlaps with most of a first lateral linear segment and a second lateral linear segment and all of a second longitudinal linear segment of the second coil 141. Meanwhile, the first portion 1521 and the second portion 1523 are made to have a generally identical thickness.

Referring to FIG. 10, when viewed in a direction A1 perpendicular to a backside of a rear cover 122, the second portion 1523 of a non-magnetic material is disposed to overlap with the metal plate 127. In the illustrated embodiment, although the second portion 1523 of a non-magnetic material is shown as also slightly overlapping with a slit 128, it is not limited thereto. In another embodiment, the slit 128 and the second portion 1523 may not overlap with each other.

Meanwhile, when viewed in the direction A1 perpendicular to the backside, the first portion 1521 of a magnetic material is disposed to overlap with a first metal plate 126. In the illustrated embodiment, although the first portion 1521 is shown as also overlapping with the slit 128, it is not limited thereto. In another embodiment, the slit 128 and the first portion 1521 may not overlap with each other.

In the illustrated embodiment, since the first portion 1521 of the core 152 is made of a magnetic material, the effects of a battery 114 on an operation of the antenna 125 (→135) are reduced. Moreover, since magnetic field lines generated by the first longitudinal linear segments 14062 and 14162 are one-sided toward the first portion 1521 of a magnetic material, a direction in which radio waves are most intensively radiated from the antenna 145 may be set to be different from a direction in which radio waves are most intensively radiated in embodiments shown in FIG. 4.

Figure 11:
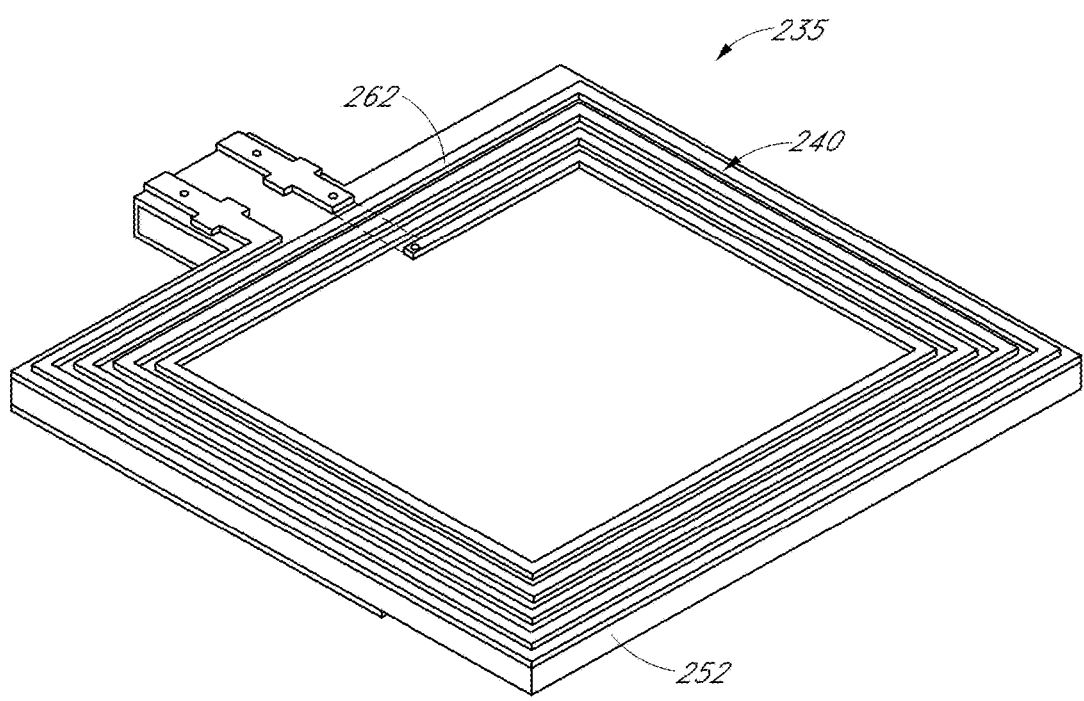
FIG. 11 is a perspective view of an NFC antenna according to embodiments of the present invention.
Figure 12:
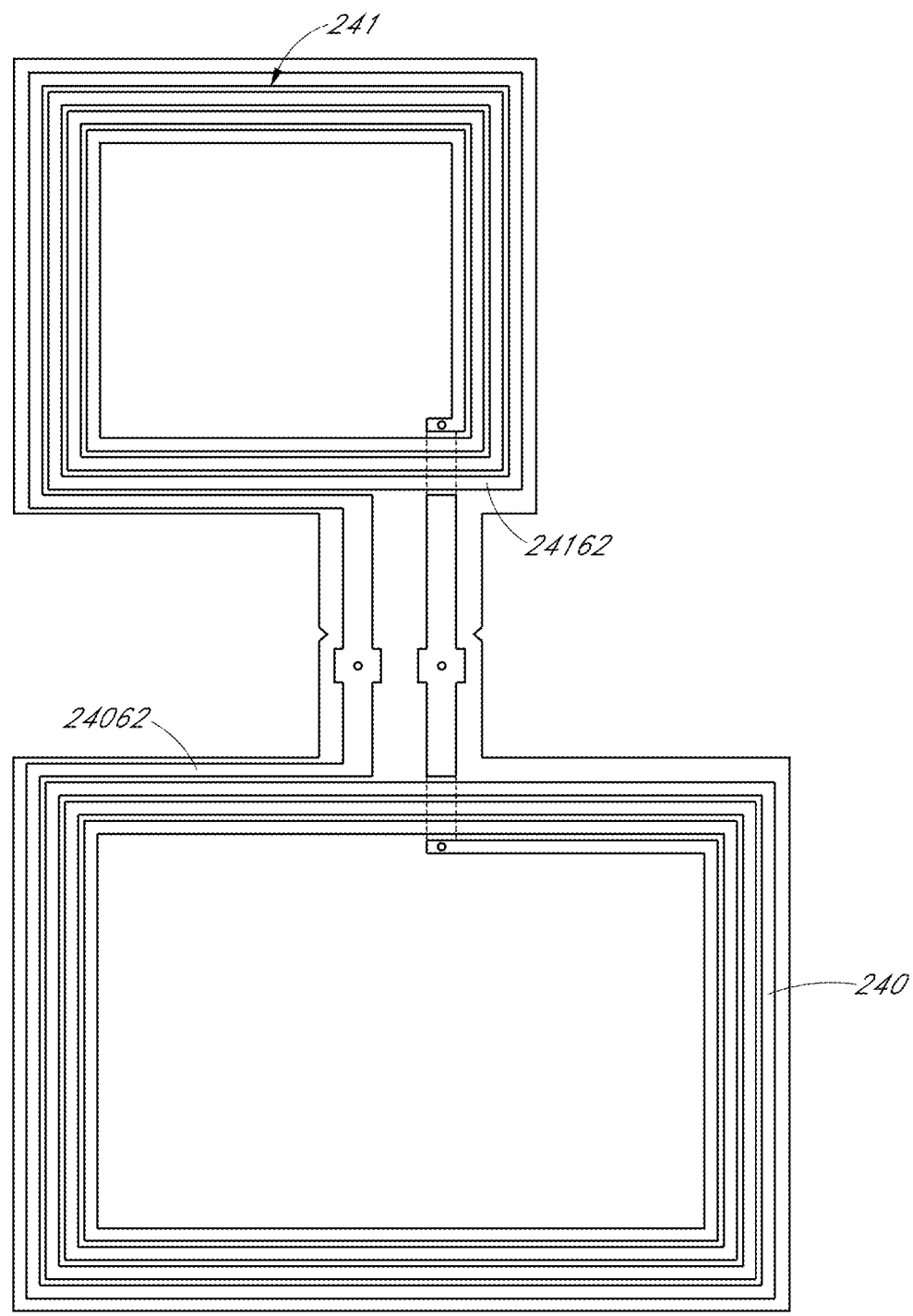
FIG. 12 is a view showing an unfolded state of an antenna coil sheet of the NFC antenna shown in FIG. 11.
Figure 13:
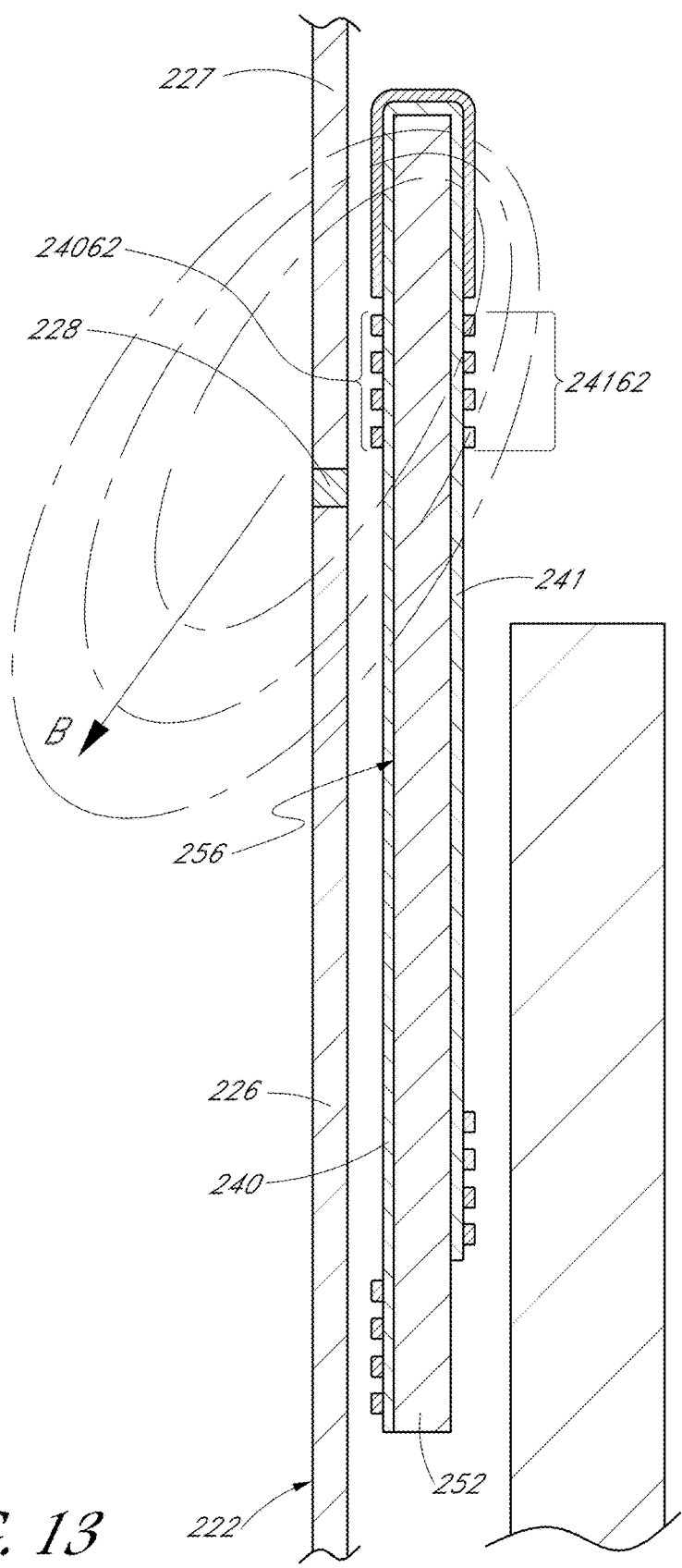
FIG. 13 is a sectional view of a portion of a smartphone according to embodiments of the present invention, showing a rear cover, a battery and the NFC antenna shown in FIG. 11 in the smartphone.

Embodiment Shown in FIGS. 11 to 13

In embodiments shown in FIGS. 11 to 13, sizes of a first coil 240 and a second coil 241 in an antenna 235 are different from each other. A first longitudinal linear segment 24162 of the second coil 241 extends to be shorter than a first longitudinal linear segment 24062 of the first coil 240. Accordingly, when viewed in a direction A1 perpendicular to a first surface 256, a portion of the first longitudinal linear segment 24062 of the first coil 240 overlaps with the first longitudinal linear segment 24162 of the second coil 241, although other portions do not overlap with each other. Further, a first lateral linear segment, a second lateral linear segment and a second longitudinal linear segment of the second coil 241 extend to be shorter than a first lateral linear segment, a second lateral linear segment and a second longitudinal linear segment of the first coil 240 in length, respectively. Meanwhile, in the illustrated embodiment, when viewed in a direction C1 perpendicular to the first surface 256, a portion of the first lateral linear segment of the first coil 240 overlaps with the first longitudinal linear segment of the second coil, although other portions do not overlap with each other. However, the second longitudinal linear segment and the second lateral linear segment of the first coil 240 and the second longitudinal linear segment and the second lateral linear segment of the second coil 241 do not have an overlapping portion, respectively. However, the present invention is not limited thereto. In another embodiment, linear segments other than the first longitudinal linear segments of the coils 240 and 241 may be configured not to overlap with each other when viewed in the direction C1 perpendicular to the first surface 156.

Referring to FIG. 13, the antenna is arranged such that the first coil 240 is disposed in proximity with a rear cover. The second coil 241 is arranged to be in proximity with the battery.

Meanwhile, a relationship of relative positions between a slit 228 of the rear cover 222 and the first longitudinal linear segments 262 and 2622 of the antenna 235 is similar to those in the several embodiments described above. Further, a positional relationship between the second longitudinal linear segments and the rear cover 222 or a battery 214 is almost identical to those in the embodiments described above.

In embodiments shown in FIGS. 11 to 13, radiation of radio waves from the first longitudinal linear segments 262 and 2622 is similar to those in the embodiments described above. However, since the second coil is smaller than the first coil in size, a resistance value, an inductance value and the like affecting performance of the antenna may be changed and thus radio wave generation characteristics of the antenna 235 may be different from those of the antenna 35 according to embodiments shown in FIGS. 4 and 5.

Figure 14:
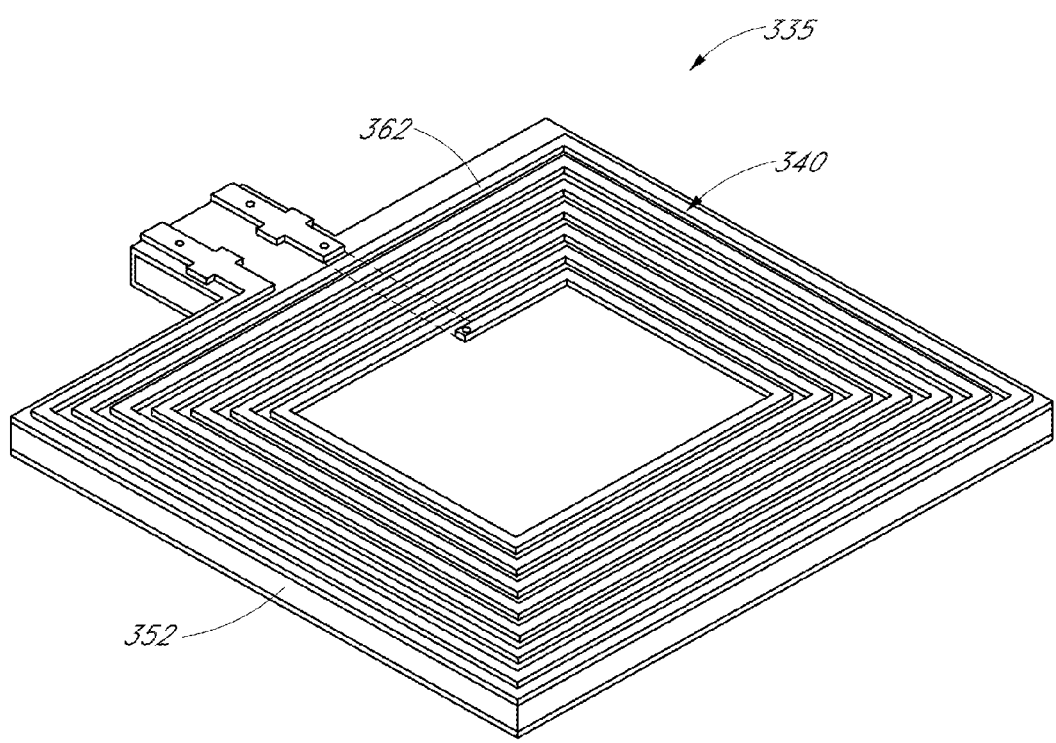
FIG. 14 is a perspective view of an NFC antenna according to embodiments of the present invention.
Figure 15:
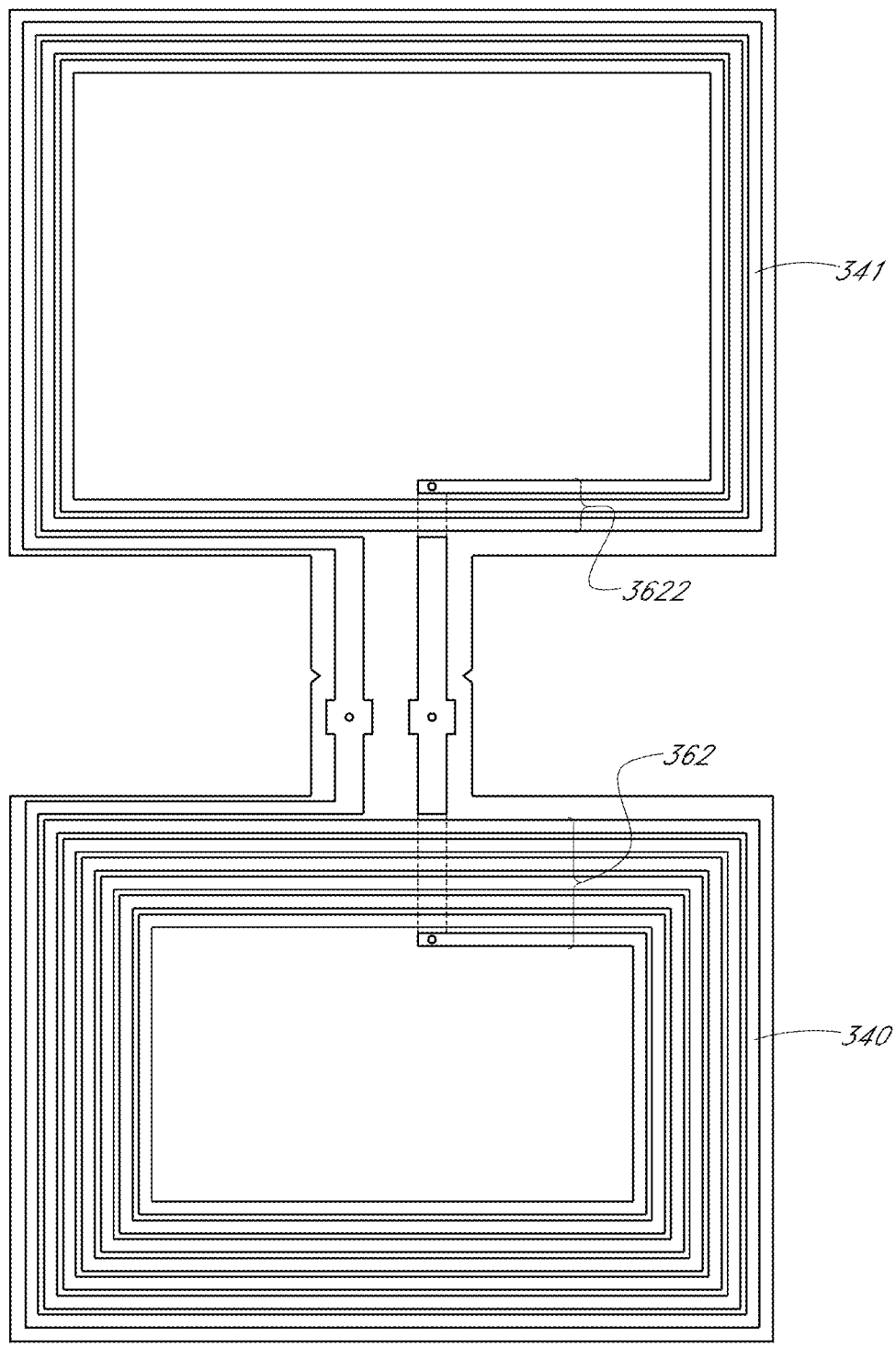
FIG. 15 is a view showing an unfolded state of an antenna coil sheet of the NFC antenna shown in FIG. 14.
Figure 16:
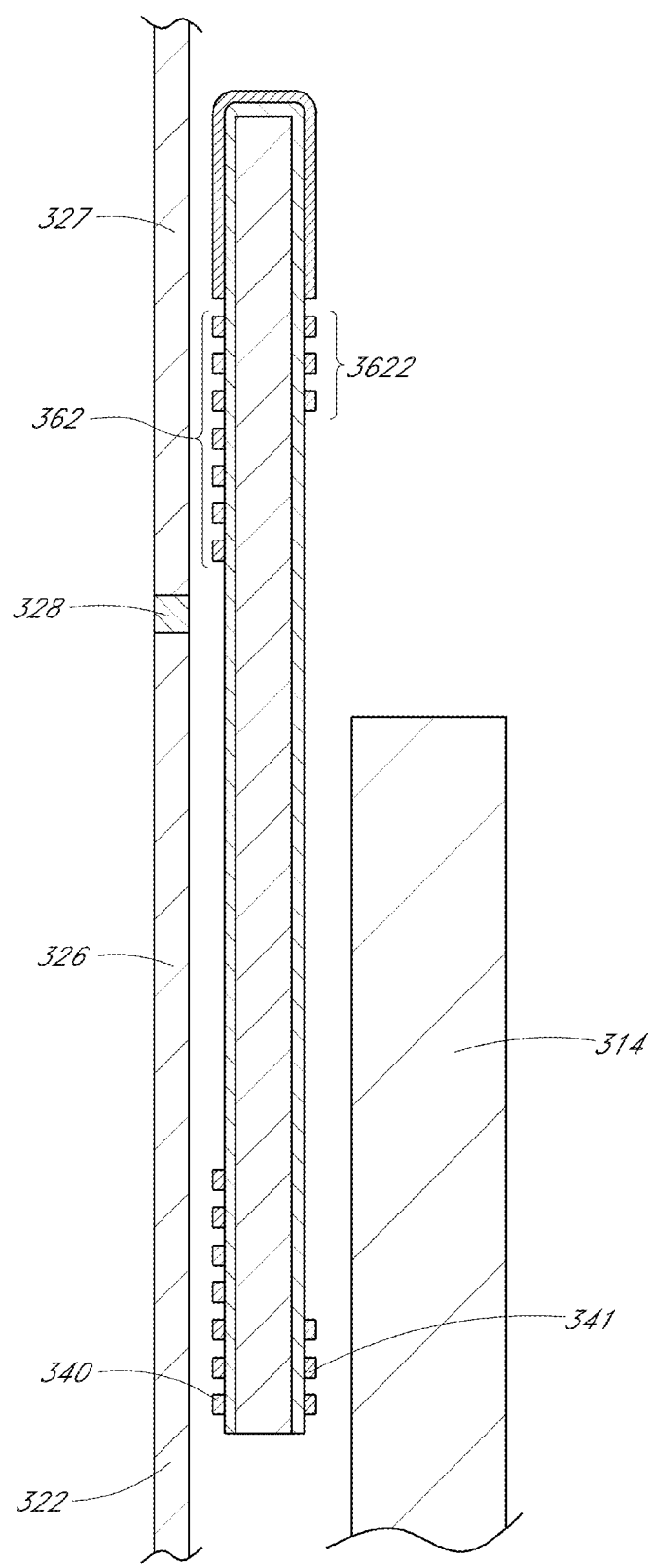
FIG. 16 is a sectional view of a portion of a smartphone according to embodiments of the present invention, showing a rear cover, a battery and the NFC antenna shown in FIG. 14 in the smartphone.
Figure 18:
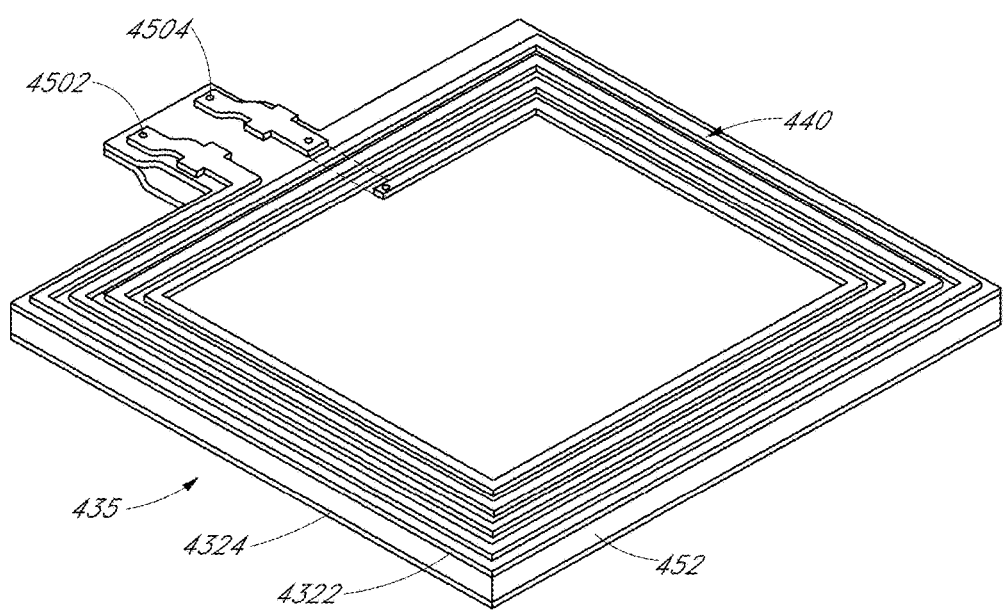
FIG. 18 is a perspective view of an NFC antenna according to embodiments of the present invention.
Figure 19:
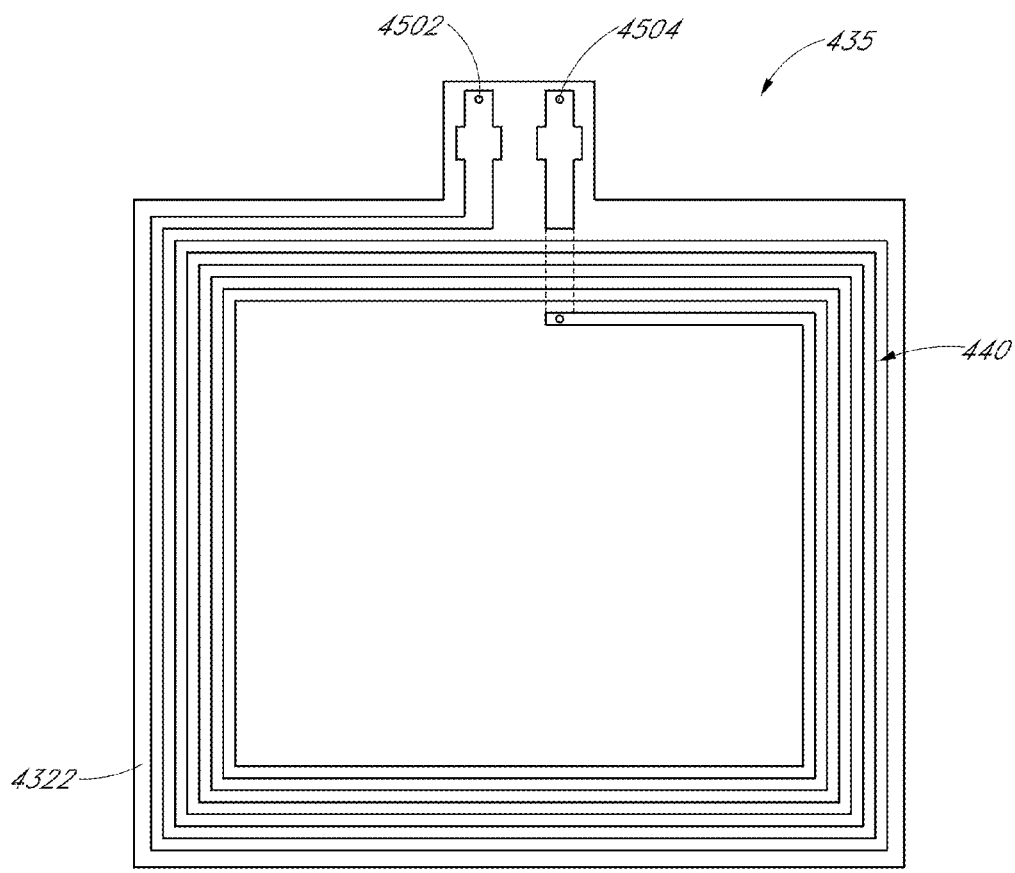
FIG. 19 is a plan view of the NFC antenna shown in FIG. 18.
Figure 20:
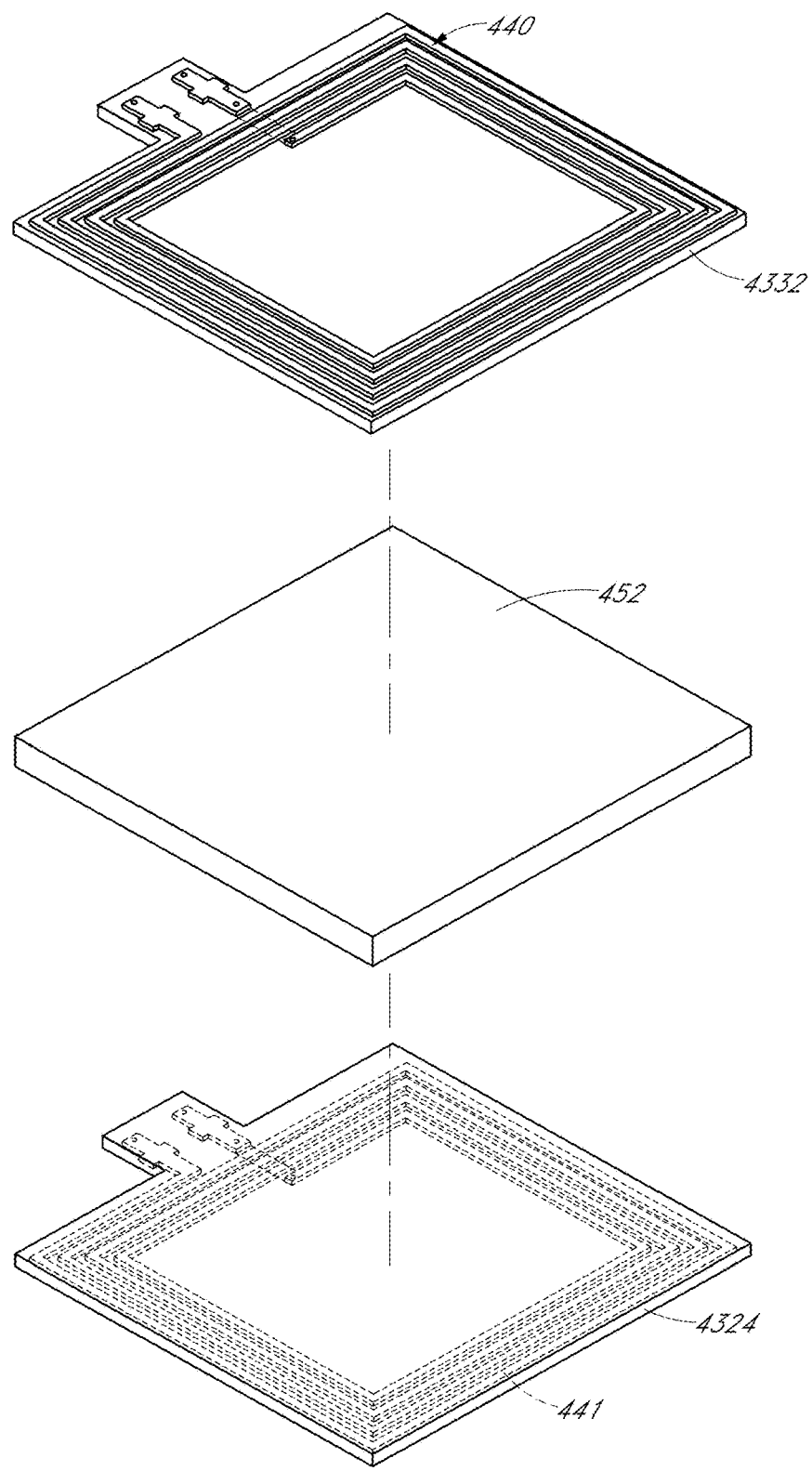
FIG. 20 is an exploded perspective view of the NFC antenna shown in FIG. 18.

Embodiment Shown in FIGS. 14 to 16

In embodiments shown in FIGS. 14 to 16, the number of turns of a wire of a first coil 340 is different from that of a second coil 341 in an antenna 335, and the number of turns of the first coil 340 arranged in proximity with a rear cover is larger. FIGS. 14 to 16 show the first coil 340 with seven turns and the second coil 341 with three turns by way of example.

In the illustrated embodiment, it is shown that a distance between an innermost line and an outermost line of the second coil 340 is smaller than a distance between an innermost line and an outermost line of the first coil 341 by equalizing distances between the lines, but the present invention is not limited thereto. The lines of the first coil 340 may be densely arranged, or the lines of the second coil 341 may be sparsely arranged. In this modified structure, the distance between the innermost and outermost lines of the first coil 340 may be almost identical to the distance between the innermost and outermost lines of the second coil 341.

Referring to FIG. 16, the antenna 335 is arranged to such that the first coil 340 is disposed in proximity with the rear cover and the second coil is disposed in proximity with the battery. Meanwhile, a relationship of relative positions between a slit 328 of the rear cover 322 and first longitudinal linear segments 362 and 3622 of the antenna 335 is identical to those in the several embodiments described above. Moreover, a positional relationship between second longitudinal linear segments and the rear cover 322 or the battery 314 is also identical to those in the several embodiments described above.

In embodiments shown in FIGS. 14 to 16, radiation of radio waves from the first longitudinal linear segments 362 and 3622 is similar to those in the embodiments described above. However, since the number of turns of the wire of the first coil is larger than that of the second coil, an inductance value, a resistance value and the like affecting performance of the antenna may be changed and thus radio wave generation characteristics of the antenna 335 may be different from those of the antenna 35 according to embodiments shown in FIG. 4.

Embodiment Shown in FIGS. 18 to 20 and 21A to 21C

Referring to FIGS. 18 to 20 and 21A to 21C, an antenna 435 has a first antenna coil sheet 4322 and a second antenna coil sheet 4324. The first antenna coil sheet 4322 and the second antenna coil sheet 4324 have a first coil 440 and a second coil 441, respectively. A core 452 is disposed between the first antenna coil sheet 4322 and the second antenna coil sheet 4324. Each of the coils may be configured to be identical to any one of the coils of the several embodiments described above.

A difference between the configuration of embodiments shown in FIGS. 18 to 20 and 21A to 21C and the configurations of the various embodiments described above is connection portions of the coils. To connect the coils 440 and 441, connection portions of the first antenna coil sheet 4322 and the second antenna coil sheet 4324 are joined to each other, and vias 4502 and 4504 are formed to penetrate through the sheets 4322 and the 4324 to connect connection lines.

Figure 21A:
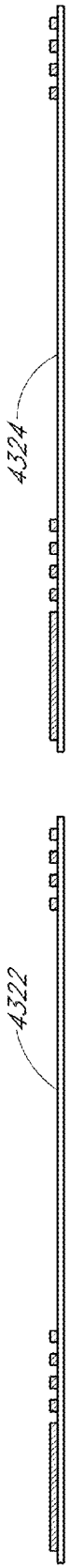
FIGS. 21A to 21C show a process of manufacturing the antenna shown in FIG. 18.
Figure 21B:
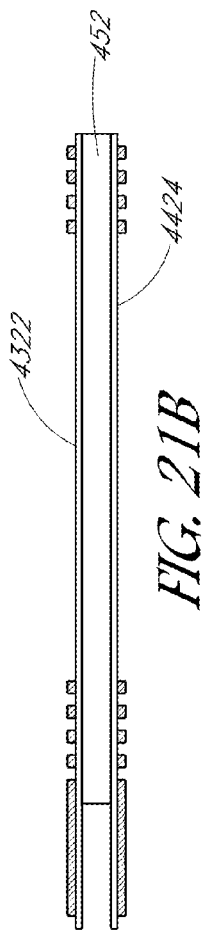
Figure 21C:

Referring to FIGS. 20 and 21A to 21C, when the antenna 435 is manufactured, the antenna coil sheets 4322 and 4324 respectively formed with the coils 440 and 441 are prepared (FIG. 21A). Then, the antenna coil sheets 4322 and 4324 and a core 452 are laminated and combined (FIG. 21B). At this point, substrates 437 of the antenna coil sheets are arranged to be disposed on the sides toward the core, and thus the substrates are positioned between the respective coils and the core. Then, the antenna 435 is completed by connecting the connection portions of the antenna coil sheets and forming the vias 4502 and 4504.

Figure 22:
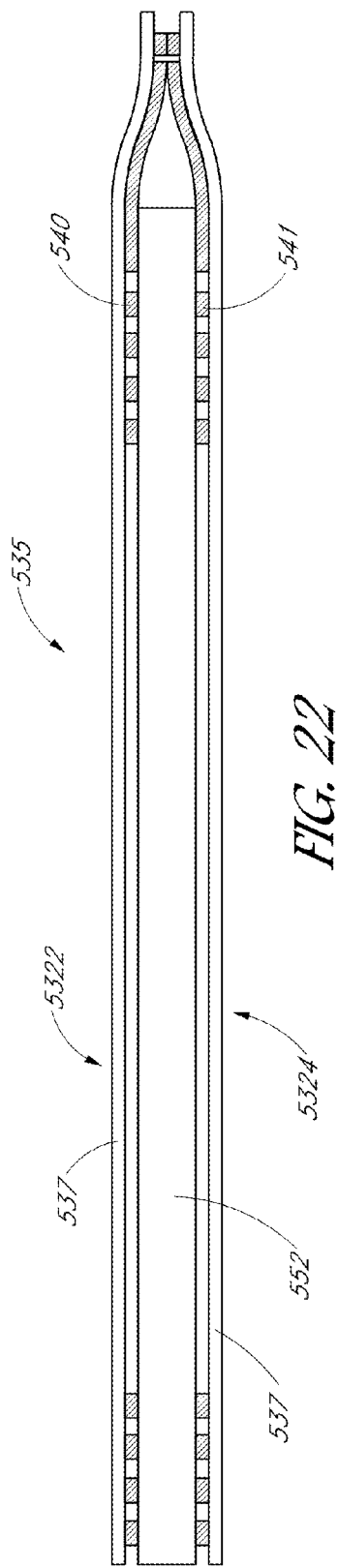
FIG. 22 is a sectional view of an NFC antenna according to embodiments of the present invention.

Embodiments Shown in FIG. 22

The antenna 535 shown in FIG. 22 is different from the antenna of embodiments described with reference to FIG. 21 in positions of coils 540 and 541 and substrates 537. Referring to FIG. 22, a coil 540 is disposed between the substrate 537 of a coil sheet 5322 and a core 532. Likewise, a coil 541 is disposed between the substrate 537 of a coil sheet 5324 and the core 532. In this configuration, it is not necessary to form a via passing through the substrates 537 to connect the coils 540 and 541.

Further Embodiment

Figure 25:
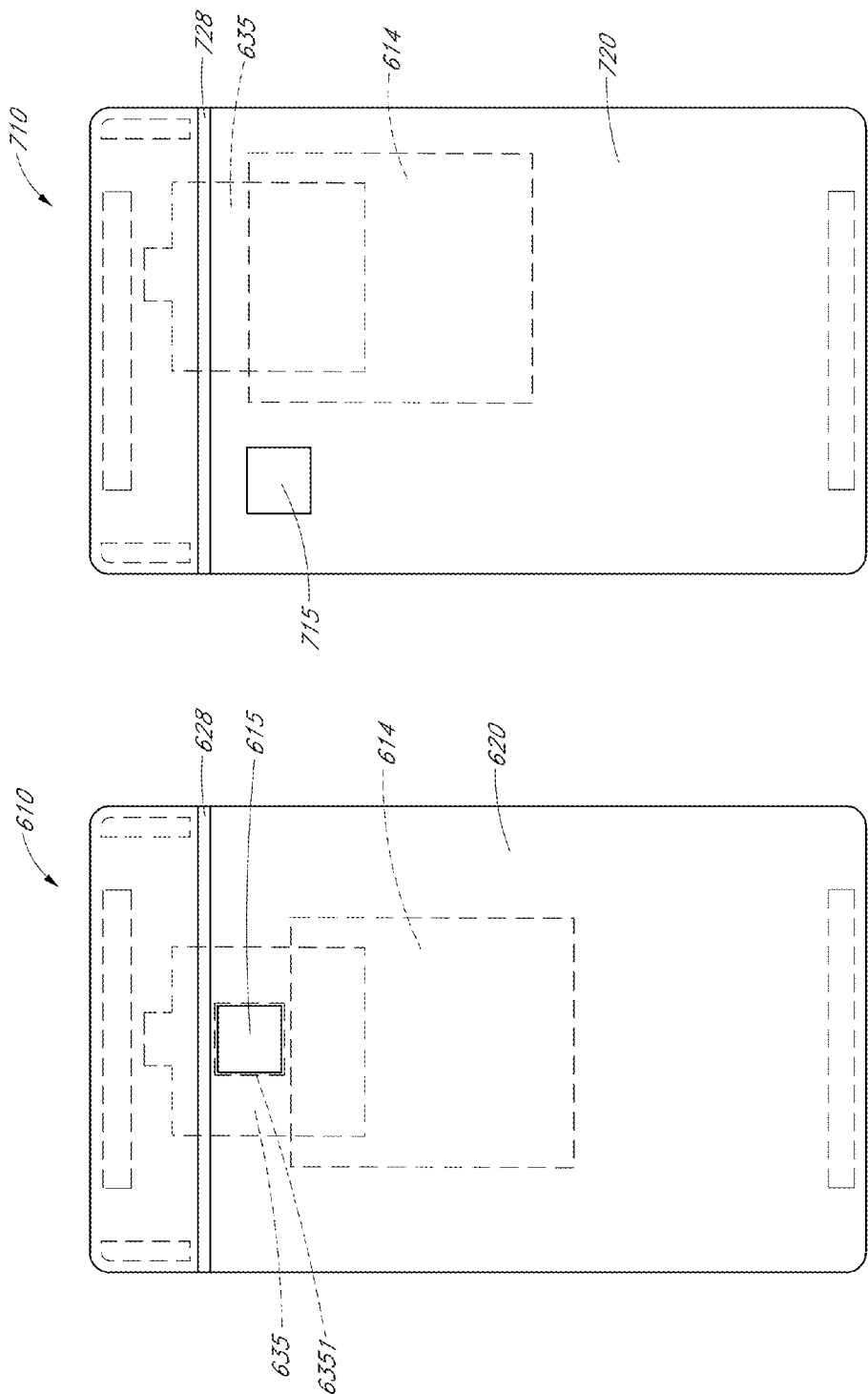
FIG. 25 is a rear view of a smartphone according to embodiments of the present invention, showing an arrangement of an antenna different from that of embodiments shown in FIG. 3.
Figure 26:
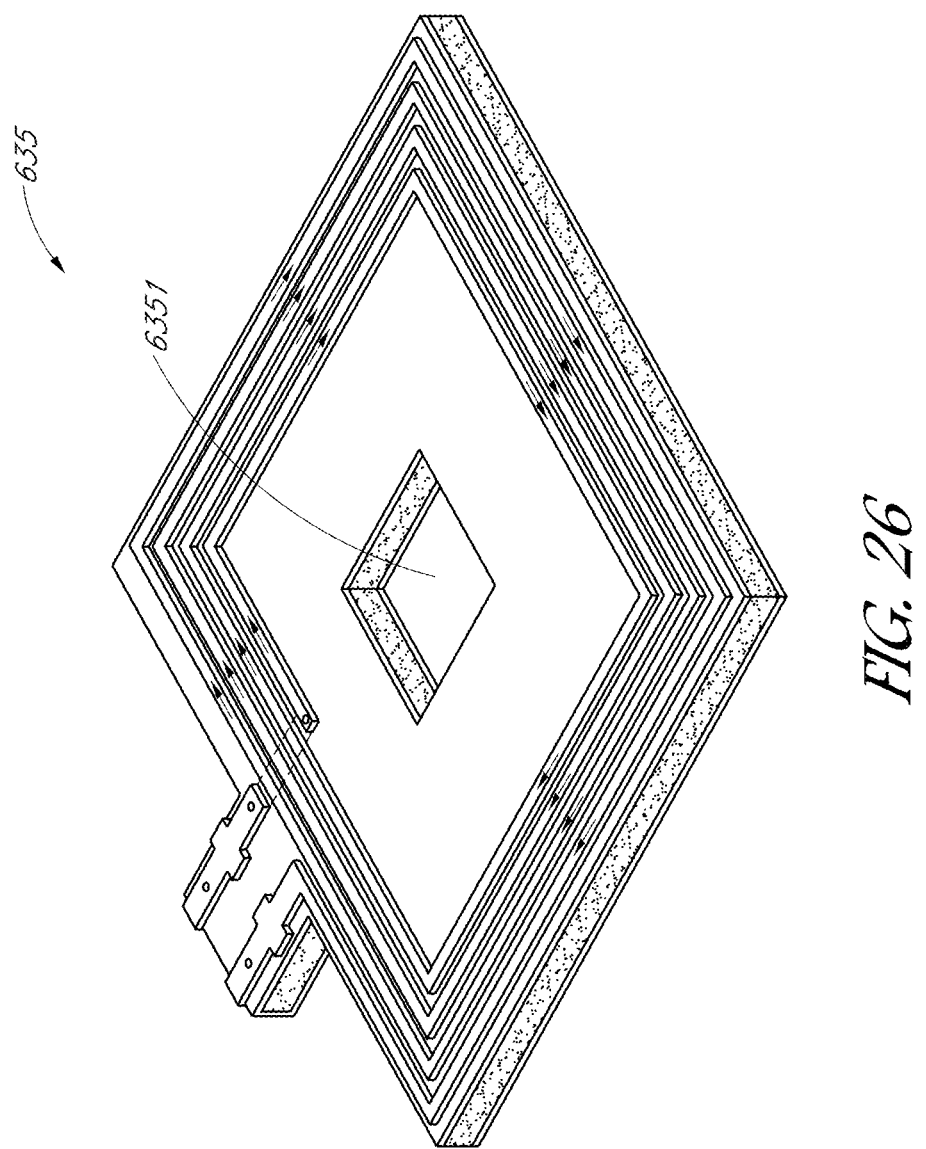
FIG. 26 is a perspective view of the antenna shown in FIG. 25.

In the embodiments shown in FIG. 3, the camera 15 and the antenna 35 are shown as being arranged at positions considerably spaced apart from each other. Alternatively, in embodiments shown in FIGS. 25 and 26, when viewed in a direction perpendicular to a backside 620 of a smartphone 610, locations of the antenna 635 and the camera 615 may overlap with each other. For this arrangement, a hole 6351 is formed at a portion of the antenna 635 corresponding to the location of the camera 615, and the camera 615 is placed in the hole. Meanwhile, a coil of the parallel stacked antenna 635 is configured to surround the camera. Unlike embodiments shown in FIG. 3, the camera 615 and the slit 628 are disposed closer to each other in embodiments shown in FIG. 25.

In embodiments shown in FIG. 27, when viewed in the direction A1 perpendicular to the backside, locations of a camera 715 and an antenna 735 do not overlap with each other, but they are disposed directly next to each other. Even in embodiments shown in FIG. 26, the camera 715 and the slit 728 are also disposed closer to each other.

In embodiments shown in FIG. 7, the antenna may have an additional magnetic core placed on the second coil to cover the second longitudinal linear segment and the first and second lateral linear segments. When the additional magnetic core is assembled in the smartphone, it is disposed between the second coil and the battery. Therefore, the effects of the battery on an operation of the antenna may be reduced.

It will be understood by those skilled in the art that the expression "two components overlap or do not overlap with each other or are superimposed on each other," the expression "one component is covered or not covered with or is concealed by another component" and the like are to express relative positions between the two components, when viewed in the direction perpendicular to the backside of the rear cover or the first surface of the magnetic core, unless other conditions are specially specified.

Although the embodiments of the present invention have been described above, it will be understood by those skilled in the art that the configurations of the various embodiments may be changed without departing from the spirit of the present invention. It will be also understood that such a change falls within the scope of the present invention.

INDUSTRIAL APPLICABILITY

As described above, embodiments of the present invention relate to a near field communication (NFC) antenna and a smartphone having the antenna, and embodiments of the present invention provide a parallel stacked NFC antenna suitable for NFC communication of a smartphone since the antenna can be miniaturized, and a component arrangement structure capable of performing effective NFC communication by determining a location of the NFC antenna.

The invention claimed is:

1. A smartphone comprising:
a housing; and
a near field communication (NFC) antenna housed in the housing,
wherein the housing comprises a rear cover defining a rear surface of the smartphone,
wherein the rear cover comprises a plurality of electrically conductive metal plate portions that comprise a first metal plate portion, and a second metal plate portion spaced apart from the first metal plate portion,
wherein the first metal plate portion comprises a first edge, the second metal plate portion comprises a second edge facing the first edge, and a gap is formed between the first edge and the second edge,
wherein the NFC antenna comprises a plate-shaped magnetic core of a ferromagnetic material, wherein the magnetic core comprises a first surface, and a second surface facing away from the first surface,
wherein the NFC antenna further comprises a first printed antenna coil placed over the first surface of the magnetic core and a second printed antenna coil placed over the second surface of the magnetic core, wherein the magnetic core is disposed between the first antenna coil and the second antenna coil,
wherein the NFC antenna is disposed inside the smartphone such that the first surface of the magnetic core faces the rear cover and such that the first antenna coil is interposed between the magnetic core and the rear cover,
wherein the first printed antenna coil and the second printed antenna coil are connected in parallel to each other so that electrical current flows in the first printed antenna coil and the second printed antenna coil in the same rotational direction when viewed in a direction perpendicular to the rear surface of the smartphone, and
wherein each of the first printed antenna coil and the second printed antenna coil comprises a first portion overlapping the first metal plate portion and a second portion overlapping the second metal plate portion, wherein the first portion comprises a line extension extending along the first edge and located in proximity with the first edge.

2. The smartphone of claim 1, wherein the first edge extends along a straight line, and the line extension of the first portion of each of the first printed antenna coil and the second printed antenna coil extends along the straight line.

3. The smartphone of claim 1, wherein the first edge extends along an arc-shaped curved line, and the line extension of the first portion of each of the first printed antenna coil and the second printed antenna coil extends along the arc-shaped curved line.

4. The smartphone of claim 1,
wherein each of the first printed antenna coil and the second printed antenna coil comprises a first longitudinal linear segment, a second longitudinal linear segment, and a first lateral linear segment and a second lateral linear segment for connecting the first and second longitudinal linear segments, wherein the first longitudinal linear segment, the first lateral linear segment, the second longitudinal linear segment and the second lateral linear segment are arranged in order to form a loop,
wherein the first portion comprises at least part of the first longitudinal linear segment, and the second portion comprises the second longitudinal linear segment,
wherein the first longitudinal linear segment comprises the line extension and at least one additional line extension that extend along the first edge and arranged parallel to each another, and
wherein the NFC antenna is disposed such that the line extensions of the first longitudinal linear segment overlap the first metal plate portion.

5. The smartphone of claim 4, wherein the NFC antenna is disposed such that the first longitudinal linear segment does not overlap the second metal plate portion when viewed in the direction.

6. The smartphone of claim 5, wherein the NFC antenna is disposed such that the first longitudinal linear segment does not comprise a line extension overlapping the gap when viewed in the direction.

7. The smartphone of claim 4, wherein portions of the first and second lateral linear segments overlap the gap when viewed in the direction.

8. The smartphone of claim 4, wherein the first longitudinal linear segment of the first printed antenna coil overlaps with the first longitudinal linear segment of the second printed antenna coil when viewed in the direction.

9. The smartphone of claim 4, wherein the second longitudinal linear segment of the first printed antenna coil does not overlap the second longitudinal linear segment of the second printed antenna coil when viewed in the direction.

10. The smartphone of claim 4, wherein the second lateral linear segment of the first printed antenna coil does not overlap the second lateral linear segment of the second printed antenna coil when viewed in the direction.

11. The smartphone of claim 4, wherein the magnetic core does not have a portion disposed between the first longitudinal linear segment of the first printed antenna coil and the first longitudinal linear segment of the second printed antenna coil.

12. The smartphone of claim 1, wherein the magnetic core does not overlap the first metal plate portion when viewed in the direction.

13. The smartphone of claim 1, further comprising a piece of electrically non-conductive material for covering the gap, wherein the electrically non-conductive material is a polymeric plastic material.

14. The smartphone of claim 1, wherein in the NFC antenna, the first printed antenna coil is placed in a first imaginary plane without being folded, the second printed antenna coil is placed in a second imaginary plane without being folded, and the first imaginary plane and the second imaginary plane are generally parallel to each other.

15. The smartphone of claim 1, wherein in the NFC antenna, a conductive via penetrating through the magnetic core to electrically connect the first printed antenna coil and the second printed antenna coil does not exist between the first printed antenna coil and the second printed antenna coil.

16. The smartphone of claim 1, further comprising a battery, wherein the first portion does not overlap the battery when viewed in the direction.

17. The smartphone of claim 1, wherein the first printed antenna coil is disposed between the magnetic core and the rear cover, and a ferromagnetic material is not interposed between the first printed antenna coil and the rear cover.

18. The smartphone of claim 1, wherein in the NFC antenna, the first printed antenna coil has a first inner end and a first outer end, the second printed antenna coil has a second inner end and a second outer end, the first and second inner ends are electrically connected and the first and second outer ends are electrically connected so that the first printed antenna coil and the second printed antenna coil are connected in parallel, and the first printed antenna coil and the second printed antenna coil are coiled in the same rotational direction when viewed in the direction.

19. The smartphone of claim 1, wherein in the NFC antenna, the first printed antenna coil has a first inner end and a first outer end, the second printed antenna coil has a second inner end and a second outer end, the first inner end and the second outer end are electrically connected and the first outer end and the second inner end are electrically connected so that the first printed antenna coil and the second printed antenna coil are connected in parallel, and the first printed antenna coil and the second printed antenna coil are coiled in opposite rotational directions when viewed in the direction.

20. A method of performing near field communication between an NFC terminal device and a smartphone provided with a near field communication (NFC) device, the method comprising:
providing the smartphone according to claim 1; and
supplying an electrical current signal to the first and second printed antenna coils to generate radio waves to be transmitted to the NFC terminal device,
wherein a position where a magnetic field strength H generated by the supply of the electrical current signal has a maximum value among positions on the rear cover is between the first edge and the second edge or a point in proximity with the second edge of the second metal plate portion.

* * * * *